(12) United States Patent
Mergener et al.

(10) Patent No.: US 10,498,148 B2
(45) Date of Patent: Dec. 3, 2019

(54) METHOD AND APPARATUS FOR CONNECTING A PLURALITY OF BATTERY CELLS IN SERIES OR PARALLEL

(71) Applicant: Milwaukee Electric Tool Corporation, Brookfield, WI (US)

(72) Inventors: Matthew J. Mergener, Mequon, WI (US); Jeffrey M. Brozek, Mequon, WI (US); Christian Funda, Brookfield, WI (US); Nicholas Konetzke, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 15/376,497

(22) Filed: Dec. 12, 2016

(65) Prior Publication Data

US 2017/0170671 A1 Jun. 15, 2017

Related U.S. Application Data

(60) Provisional application No. 62/266,215, filed on Dec. 11, 2015.

(51) Int. Cl.
*H02J 7/00* (2006.01)
(52) U.S. Cl.
CPC .......... *H02J 7/0024* (2013.01); *H02J 7/0019* (2013.01); *H02J 7/0042* (2013.01)
(58) Field of Classification Search
USPC .................................................. 320/117, 114
See application file for complete search history.

(56) References Cited

U.S. PATENT DOCUMENTS

| 4,957,831 A | 9/1990 | Meredith et al. |
| 5,537,390 A * | 7/1996 | Horiba .................. H01M 10/48 320/134 |

(Continued)

FOREIGN PATENT DOCUMENTS

| JP | H05137265 A | 6/1993 |
| JP | 2011205872 A | 10/2011 |

(Continued)

OTHER PUBLICATIONS

Black & Decker, "ThunderVolt 24 Volt Cordless System Instruction Manual," 1990 (32 pages).

(Continued)

*Primary Examiner* — Samuel Berhanu
(74) *Attorney, Agent, or Firm* — Michael Best & Friedrich LLP

(57) ABSTRACT

Methods and systems for selectively connecting a plurality of battery cells in a dual-mode battery pack in series and parallel configurations and/or for individual cell monitoring. A dual-mode battery pack may generally include a housing; a first set of battery cells connected in series; and a second set of battery cells connected in series. The battery pack may also include series connection contacts selectively connectable to the first set of battery cells and to the second set of battery cells and, when engaged, connecting the first set of battery cells and the second set of battery cells in a series configuration; and parallel connection contacts selectively connectable to the first set of battery cells and the second set of battery cells and, when engaged, connecting the first set of battery cells and the second set of battery cells in a parallel configuration.

15 Claims, 37 Drawing Sheets

(56) References Cited

U.S. PATENT DOCUMENTS

| | | | |
|---|---|---|---|
| 6,043,626 A * | 3/2000 | Snyder | A45F 5/02 320/107 |
| 7,176,656 B2 * | 2/2007 | Feldmann | B25F 5/00 320/112 |
| 7,397,219 B2 | 7/2008 | Phillips et al. | |
| 7,486,049 B2 * | 2/2009 | Wan | H02J 7/0031 320/134 |
| 7,602,145 B2 * | 10/2009 | Renda | B60L 11/1855 320/116 |
| 2006/0071636 A1 | 4/2006 | Phillips et al. | |
| 2006/0071643 A1 * | 4/2006 | Carrier | H01M 10/4257 320/132 |
| 2011/0001456 A1 * | 1/2011 | Wang | H02J 7/0016 320/117 |
| 2011/0101919 A1 * | 5/2011 | Polk | H01M 10/0525 320/118 |
| 2011/0250484 A1 | 10/2011 | Meng | |
| 2011/0296218 A1 * | 12/2011 | Kim | H02J 3/32 713/323 |
| 2012/0133310 A1 | 5/2012 | Lee | |
| 2013/0002261 A1 | 1/2013 | Matsuura | |
| 2013/0106355 A1 | 5/2013 | Kim | |
| 2013/0320926 A1 | 12/2013 | Kerfoot, Jr. | |
| 2016/0020443 A1 | 1/2016 | White et al. | |
| 2016/0126533 A1 | 5/2016 | Velderman et al. | |
| 2016/0204475 A1 | 7/2016 | White et al. | |

FOREIGN PATENT DOCUMENTS

| | | |
|---|---|---|
| JP | 2013179739 A | 9/2013 |
| WO | 2017174419 | 10/2017 |

OTHER PUBLICATIONS

Snap-On, "New Products Catalog" 2014 (3 pages).
Images of Snap-On CTB8172 Battery Pack available as early as Sep. 8, 2016 4 pages).
International Search Report and Written Opinion for Application No. PCT/US2016/066216 dated Mar. 30, 2017 (12 pages).
International Preliminary Report on Patentability for Application No. PCT/US2016/066216 dated Jun. 21, 2018 (11 pages).
Japanese Patent Office Action for Application No. 2018527076 dated Apr. 16, 2019, with English translation, 6 pages.
European Patent Office Search Report for Application No. 16874065.2, dated Apr. 1, 2019, 9 pages.
New Zealand Intellectual Property Office First Examination Report for Application No. 742209 dated Nov. 13, 2018 (5 pages).
Australian Patent Office Action for Application No. 2016366842 dated Mar. 6, 2019 (3 pages).
Korean Patent Office Action for Application No. 10-2018-7019733 dated Aug. 9, 2019 (21 pages including English translation).

* cited by examiner

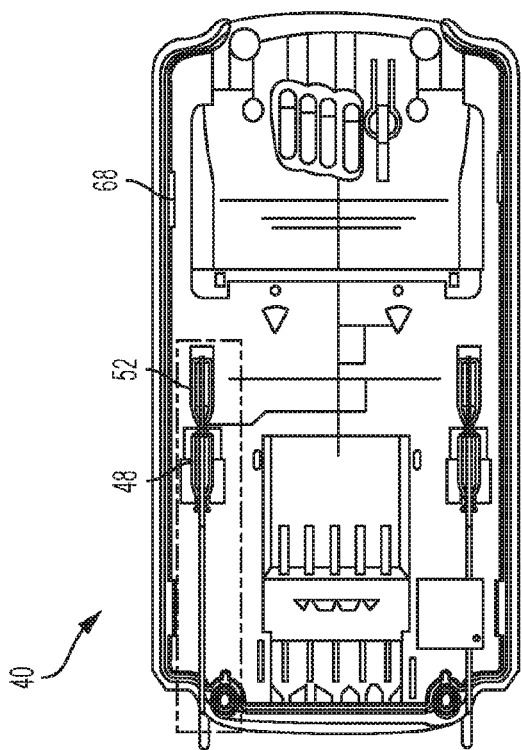
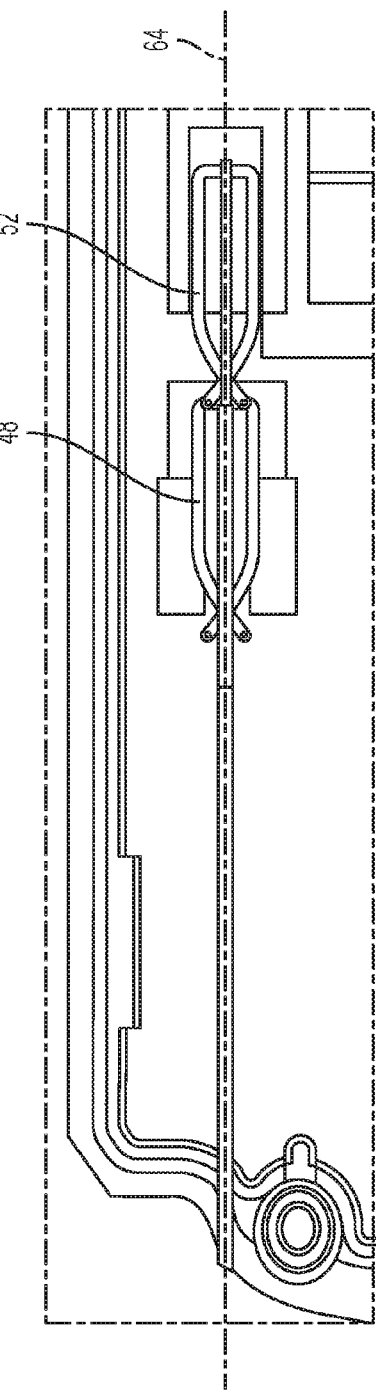
FIG. 18A
FIG. 18B

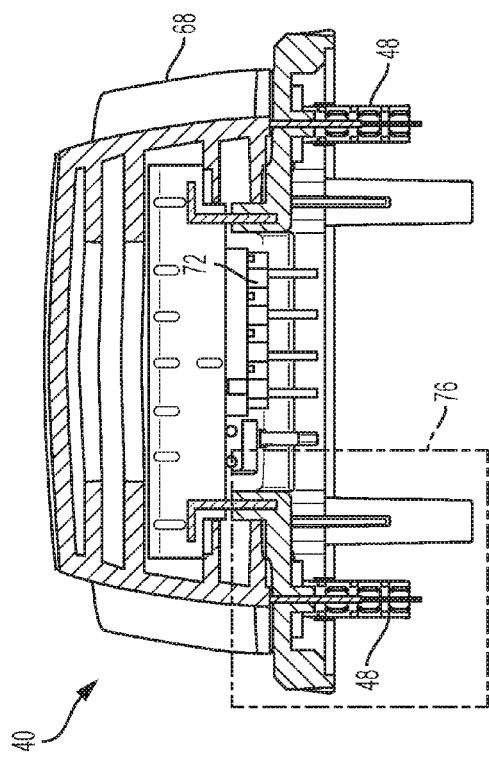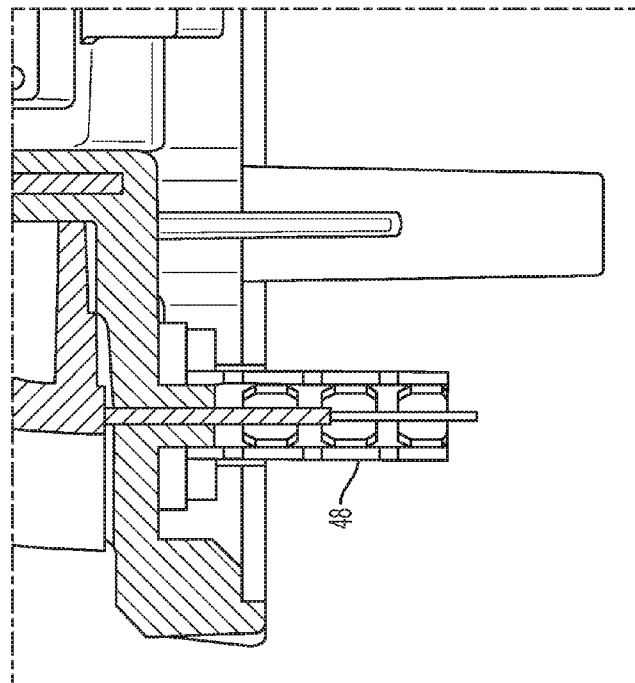

METHOD AND APPARATUS FOR CONNECTING A PLURALITY OF BATTERY CELLS IN SERIES OR PARALLEL

RELATED APPLICATION

This application claims priority to U.S. Provisional Patent Application No. 62/266,215, filed on Dec. 11, 2015, the entire contents of which is hereby incorporated by reference.

FIELD

The present invention generally relates to battery packs and, more specifically, to battery packs in power tools and other electrical devices.

SUMMARY

Generally, within a particular platform, power tools and other electronic devices (generally referred to herein as "tools" or a "tool") and the associated battery packs are configured to operate at a particular voltage level (e.g., 12V, 18V or 28V). In some cases, it may be desirable to operate a tool at a higher voltage than available from a particular battery pack (e.g., 36V instead of 18V). While it is possible to put more cells in series to make new higher voltage battery packs (e.g., 36V packs) for the higher voltage-capable tools, this would require the user to purchase separate higher voltage packs, which would not be able to power tools at the lower voltage.

Accordingly, it may be advantageous for a user to be able to use an available battery pack to drive a tool at a lower voltage (and with an increased amp-hour capacity or run-time) in some instances or, in other instances, to drive a tool at a higher voltage. This option allows the user to use a single battery pack in each instance, rather than having separate low-voltage and high-voltage battery packs. Therefore, a technique to change the voltage of a battery pack (e.g., with 10 cells) between a lower voltage and a higher voltage (e.g., 18V and 36V) may be desirable to allow a single battery pack to selectively output different voltages depending on whether the battery pack is coupled to a device operating at a low voltage or a high voltage (e.g., 18V and 36V).

Embodiments disclosed herein are generally made with reference to 18V and 36V voltage levels for the parallel and series configurations, respectively. However, the embodiments and the disclosed techniques are not limited to these particular voltage levels and are similarly applicable to different voltage levels (for example, 12V and 24V, 20V and 40V, 28V and 56V, 60V and 120V, as well as other voltage levels), configurations, amp-hour capacities, etc.

Independent embodiments and methods may be provided to selectively connect a plurality of battery cells in a dual-mode battery pack in series and parallel configurations.

The dual-mode battery pack may be set to either the series or parallel configuration depending on the power tool or other electrical device attached to the pack. For example, when a tool operating at a lower voltage (e.g., 18V) is coupled to the dual-mode battery pack, the pack is set to a parallel configuration to output the lower voltage (while providing an increased amp-hour capacity or run-time); when a tool operating at a higher voltage (e.g., 36V) is coupled to the dual-mode battery pack, the pack is set to a series configuration to output the higher voltage. The low-voltage tool and the high-voltage tool may be different devices or may be a device operating in different modes.

Several different battery pack and tool configurations may be used to implement the dual-voltage capability. A tool may have a physical configuration to, upon coupling with the battery pack, cause the dual-mode battery pack to automatically configure or be configured to one of the series or parallel arrangement to output the appropriate voltage level for that tool. For example, an arrangement of insulating ribs, recesses, and contacts on the tool(s) and/or the dual-mode battery pack may result in such a configuration (see, e.g., FIGS. 15-23).

Additionally, in some constructions, a user actuator (e.g., a toggle switch) may be provided on the battery pack to mechanically make and break electrical connections to switch between series and parallel configurations of the battery pack.

Further, in some constructions, solid-state electronics (e.g., in the tool and/or the battery pack) may switch between the series and parallel configurations either automatically (e.g., upon a monitoring circuit detecting a characteristic of a tool being attached) or manually (e.g., via a user selection (the toggle switch)).

In one independent embodiment, a dual-mode battery pack may generally include a housing; a first set of battery cells connected in series and positioned in the housing; a second set of battery cells connected in series and positioned in the housing; series connection contacts selectively connectable to the first set of battery cells and to the second set of battery cells and, when engaged, connecting the first set of battery cells and the second set of battery cells in series; and parallel connection contacts selectively connectable to the first set of battery cells and the second set of battery cells and, when engaged, connecting the first set of battery cells and the second set of battery cells in parallel.

In another independent embodiment, a method may be provided for configuring a dual mode battery pack. The method may generally include disengaging, with an insulating rib of a tool, parallel connection contacts operable to connect a first set of battery cells and a second set of battery cells in parallel; and engaging, with conducting blades of the tool, series connection contacts operable to connect the first set of battery cells and the second set of battery cells in series.

In yet another independent embodiment, a dual-mode battery pack may generally include a housing; a first set of battery cells connected in series and positioned in the housing; a second set of battery cells connected in series and positioned in the housing; a first analog front end connected to the first set of battery cells and configured to individually monitor the first set of battery cells; a second analog front end connected to the second set of battery cells and configured to individually monitor the second set of battery cells; and an electronic processor connected to the first analog front end and the second analog front end.

Other independent aspects of the invention will become apparent by consideration of the detailed description, claims and accompanying drawings.

BRIEF DESCRIPTION OF THE DRAWINGS

FIG. 18A is the bottom view of the top housing of the battery pack of FIG. 15.

FIG. 18B is an enlarged bottom view of a portion of the top housing as shown in FIG. 18A.

FIG. 19A is a rear view of the top housing of the battery pack of FIG. 15.

FIG. 19B is an enlarged rear view of a portion of the top housing as shown in FIG. 19A.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Figure 1:
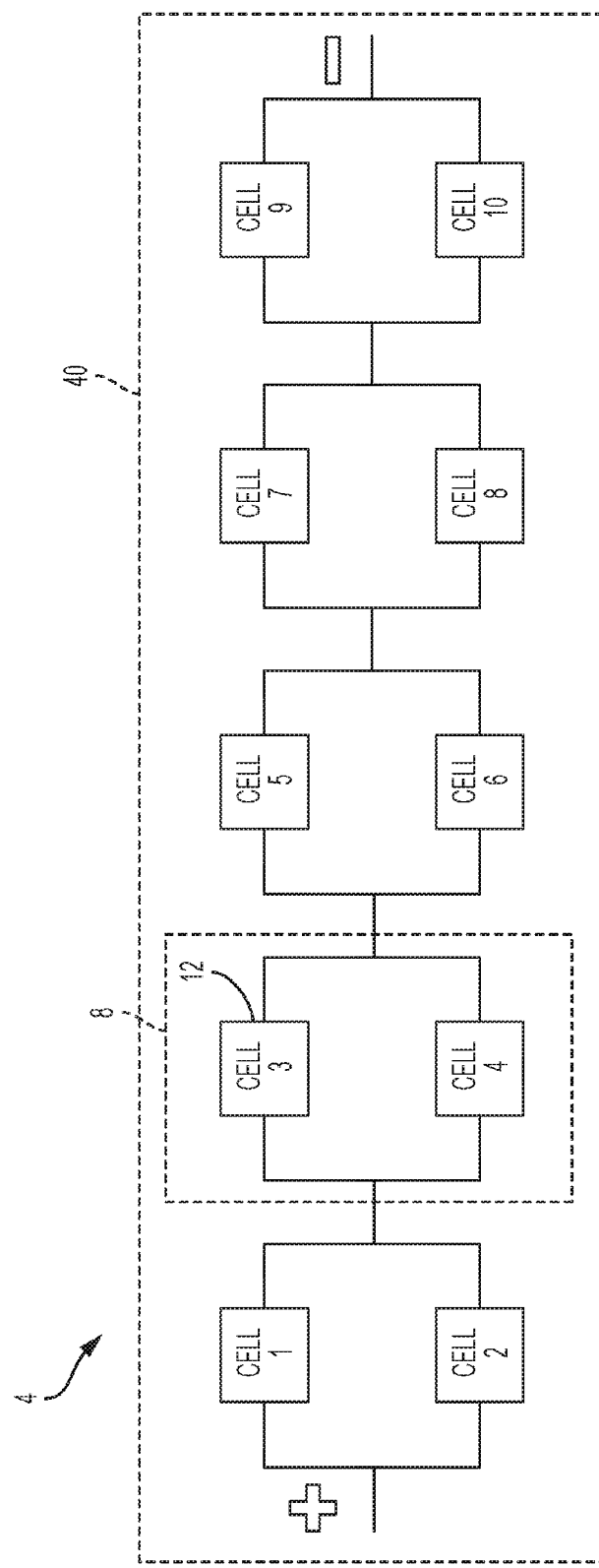
FIG. 1 is a schematic diagram of a first configuration of battery cells in a battery pack.
Figure 2:
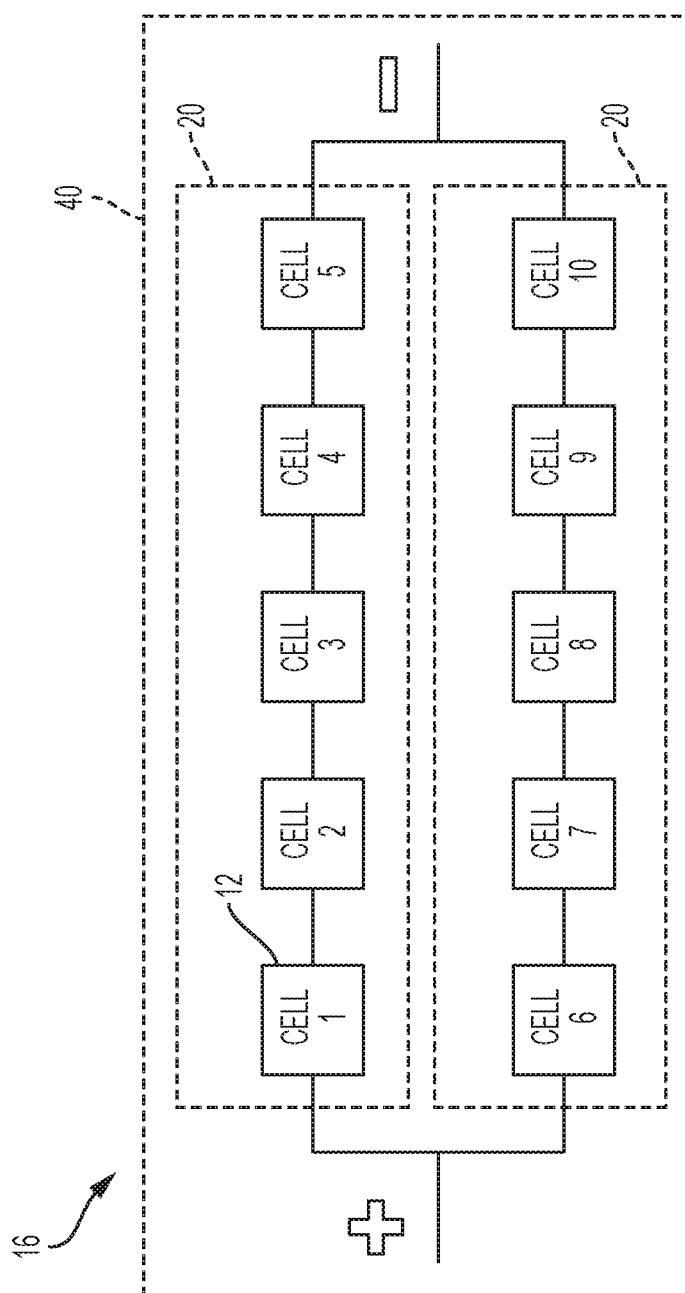
FIG. 2 is a schematic diagram of a second configuration of battery cells in a battery pack.

Various techniques and configurations of the battery packs may be used to switch the battery pack between a configuration providing a lower output voltage level (and with an increased amp-hour capacity or run-time) and a configuration providing a higher output voltage level. FIGS. 1-2 illustrate, in a battery pack 40 for a tool 44 (see FIGS. 15-23), two exemplary battery cell connection layouts 4, 16 (without switches) for providing a series configuration, for a higher voltage output, and a parallel configuration, for a lower voltage output and an increased amp-hour capacity or run-time. The first layout 4 (see FIG. 1) generally includes five blocks 8 in a series connection, with each block 8 having two cells 12 in parallel. The second layout 16 (see FIG. 2) generally includes a block 20 of five series-connected cells 12 in parallel with another block 20 of five series-connected cells 12. Each configuration provides the same nominal output voltage as well as capacity.

As an example, each cell 12 may have a lithium-based chemistry and a nominal voltage of about 3.6V with a capacitance of about 1500 milliampere hours (mAh). Five such cells 12 connected in series provide a total nominal output voltage of 18V, and ten such cells 12 connected in series provide a total nominal output voltage of 36V. Other numbers of cells 12 and/or cell types (with different chemistries, voltage levels, capacities, etc.) may be used in other embodiments to provide desired characteristics of the battery pack 40.

As described in detail below, an Analog Front End (AFE) or other circuit may be used to monitor the cells 12. In the first layout 4, monitoring each pair of cells 12 (i.e., each block 8) may be sufficient. In the second layout 16, each cell 12 may be monitored. Some embodiments may further include cell balancing circuitry to balance cells 12 of the battery pack 40 when in a parallel configuration.

To transition either configuration between a parallel configuration (with lower voltage output and a series configuration (with a higher voltage output), a switching mechanism may be employed. Several switches may be placed in the various circuits to switch between the parallel and series configurations. Those switches may be realized using, for example, mechanical switches, relay switches, bipolar junction transistors (BJTs), metal-oxide-semiconductor field-effect transistors (MOSFETs), etc.

Figure 3:
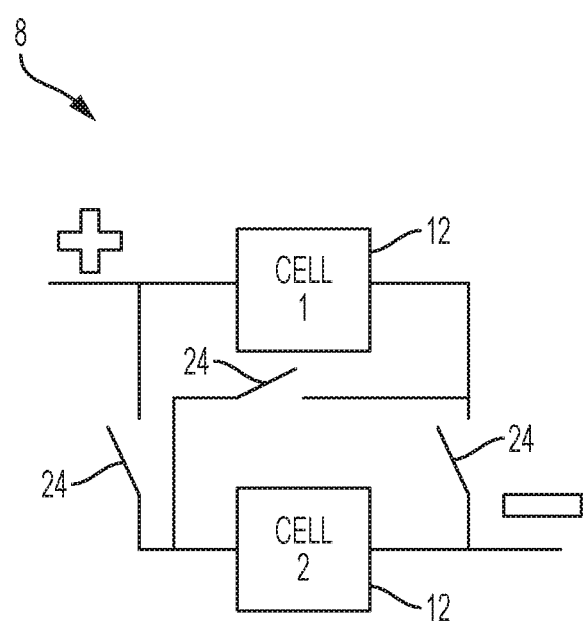
FIG. 3 is a schematic diagram of a configuration of switches in a battery pack.
Figure 4:
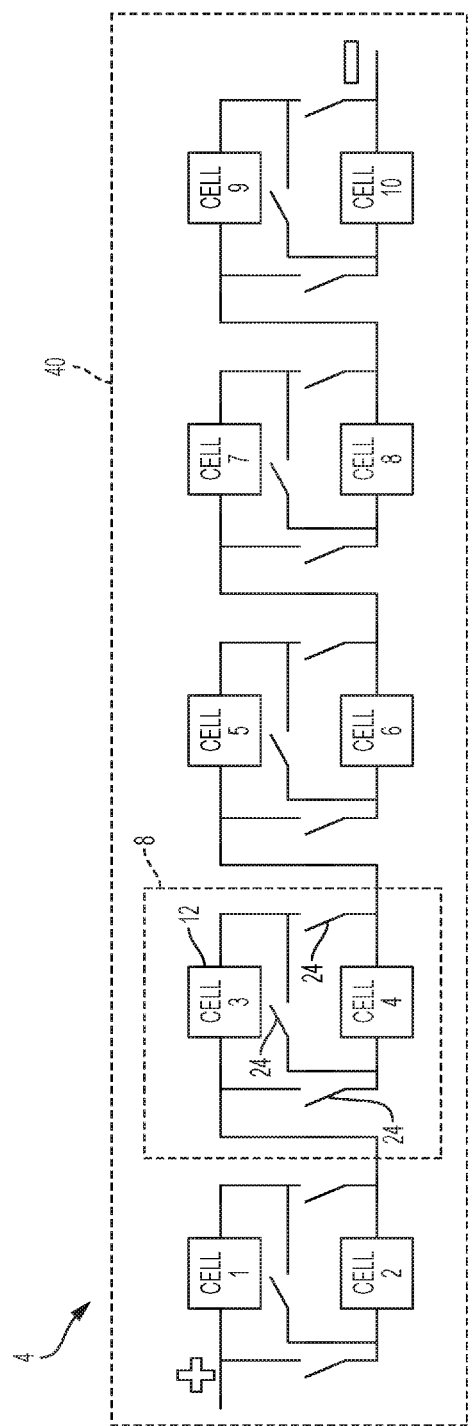
FIG. 4 is a schematic diagram of a configuration of switches in a battery pack.
Figure 5:
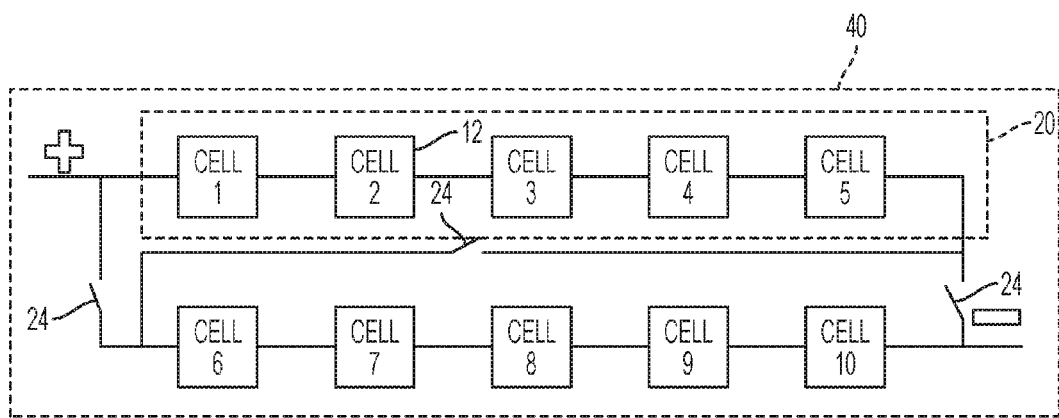
FIG. 5 is a schematic diagram of a configuration of switches in a battery pack.

In the first layout 4 (FIG. 1), one block 8 may use at least three switches 24 to switch between the parallel and series connection of the cells 12. FIG. 3 illustrates how the switches 24 may be arranged to switch such a block 8 between the parallel and series configurations. Applying this approach to the circuit from FIG. 1 would result in fifteen switches 24, as shown in FIG. 4. In FIG. 5, three switches 24 are used in combination with the second layout 16 (FIG. 2) to implement a technique to switch between a series and parallel connection of the blocks 20 and the cells 12.

Several different switching techniques may be used to accomplish switching between series and parallel configurations. Several such approaches are discussed below for illustration purposes. Other approaches, however, are also possible and contemplated by this disclosure.

Figure 6:
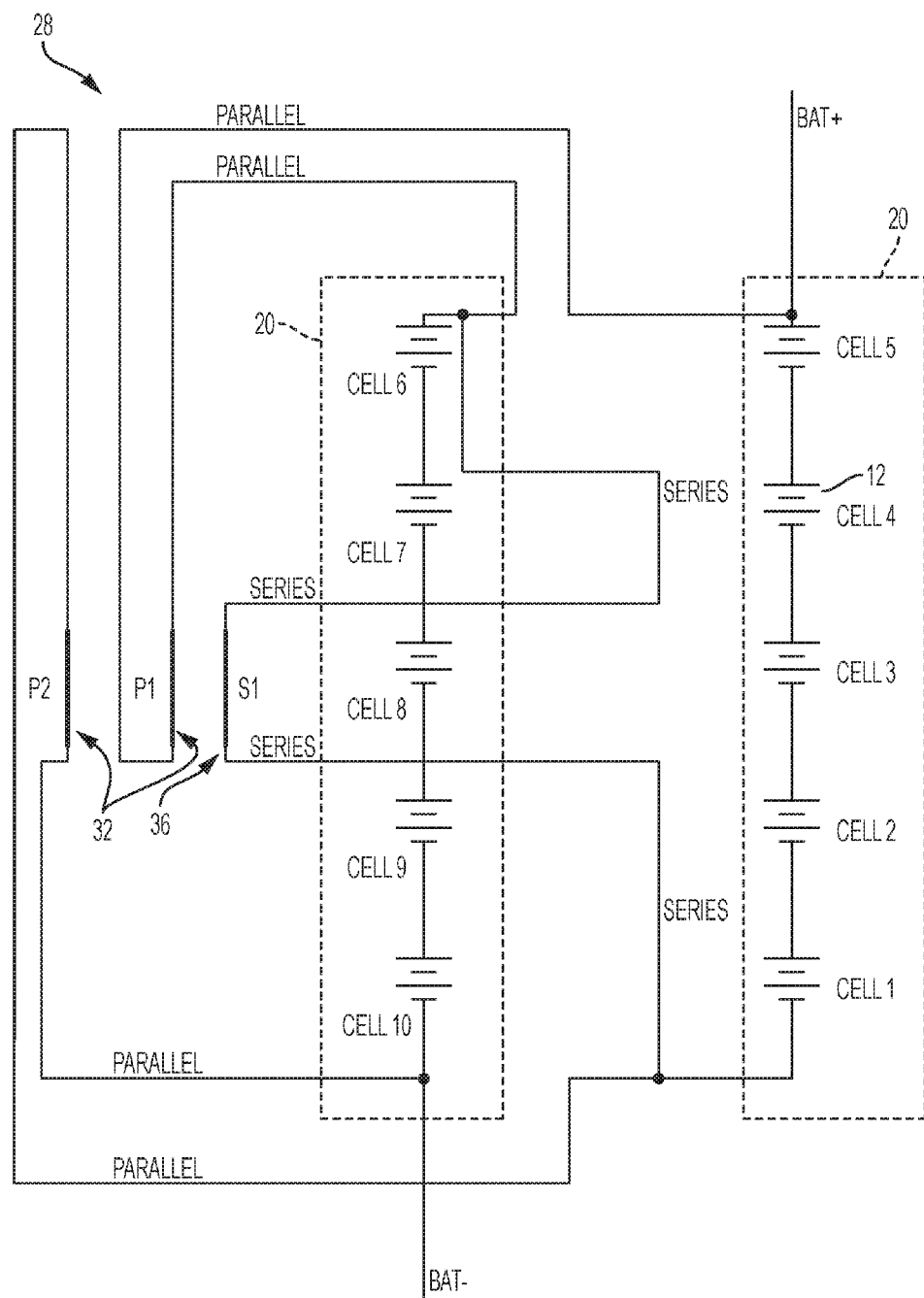
FIG. 6 is a circuit diagram of one construction of a battery pack.

FIG. 6 illustrates a circuit 28 for a dual-mode battery pack 40 for selectively connecting cells 12 in series and parallel configurations with a configuring mechanism. As illustrated, the circuit 28 includes two blocks 20 of five cells 12 (e.g., as in the second cell layout 16). Each block 20 of five cells 12 is connected to parallel contacts 32 and to series contacts 36. The cells 12 are connected by wires and through the selected contacts 32, 36 to a connection point (power contacts (not shown)) for electrically connecting to the tool.

When the user connects a tool 44 to the battery pack 40, this connection may be used to determine whether the battery pack 40 operates in the series configuration of the battery cells 12 to provide high voltage or in the parallel configuration of the battery cells 12 to provide a low voltage. The cells 12 in the dual-mode battery pack 40 are connected in parallel when the configuring mechanism (e.g., on the tool 44) (1) opens (or leaves open) the series connection contacts 36 and (2) closes (or leaves closed) the parallel connection contacts 32. Alternatively, the cells 12 are connected in series when the configuring mechanism (1) opens (or leaves open) the parallel connection contacts 32 and (2) closes (leaves closed) the series connection contacts 36.

In FIG. 6, the bars S1, P1, and P2 symbolize the tool 44, which is approaching and which, under different circumstances, closes or opens the contacts 32, 36 for the series or parallel configuration. When the P1 and P2 bars are conducting and the S1 bar is open, the cells 12 are in a parallel configuration. When S1 bar is conducting and the P1 and P2 bars are open, the cells 12 are in a series configuration.

Alternatively, in some instances, one or more of the bars S1, P1, and P2 that are not conductors are part of the tool 44. For example, the parallel connection contacts 32 may be normally-closed contacts of the battery pack 40 that are electrically separated (e.g., by an insulator of the tool 44) in the series configuration.

The series connection bar S1 may include a conducting blade contact of a tool 44 that interfaces with normally-open series connection contacts 36 of the battery pack 40. The normally-open series connection contacts 36 are open in the parallel configuration and then closed (e.g., by the conducting bar S1 of the tool 44) in the series configuration.

For example, when a tool operating at a low voltage is coupled to the battery pack 40, the parallel connection contacts 32 are undisturbed and left in their normally-closed state, while the series connection contacts 36 are also undisturbed and left in the normally-open state, to provide the low voltage, parallel configuration of the battery pack 40 for powering the tool. When a tool operating at a high voltage is coupled to the battery pack 40, insulating ribs (for example, represented by bars P1 and P2) of the tool separate and place the parallel connection contacts 32 in an open state, while a conducting blade (the bar Si) of the tool connects and places the series connection contacts 36 in a closed state, to provide the high voltage series configuration of the battery pack 40 for powering the tool.

FIGS. 15-23 illustrate a mechanism for configuring the circuit 28 of FIG. 6. More particularly, a connection between a dual-mode battery pack 40 and a power tool 44 is illustrated. The dual-mode battery pack 40 has (see FIG. 20) two sets of contacts: parallel connection contacts 48 and series connection contacts 52. The parallel connection contacts 48, when closed, connect the cells 12 in a parallel configuration, and the series connection contacts 52, when closed, connect the cells 12 in a series configuration. To avoid a short circuit, both the parallel connection contacts 48 and the series connection contacts 52 may not be closed at the same time.

The dual-mode battery pack 40 will be selectively and alternatively configured in the parallel configuration or the series configuration depending on the voltage level for operating the attached tool. For example, when a tool operating at a low voltage (e.g., 18V) is coupled to the pack 40, the pack 40 is set to the parallel configuration to output the low voltage level. When a tool operating at a high voltage (e.g., 36V) is coupled to the pack 40, the pack 40 is set to the series configuration to output the high voltage level.

To this end, with the normally-closed parallel contacts 48 and the normally-open series contacts 52, the tool operating at the low voltage level is configured to avoid interfering with or changing the normal condition of the contacts 48, 52. In contrast, the tool operating at the high voltage level interferes with and changes the normal condition of the contacts 48, 52

Specifically, the tool includes insulating structure (e.g., ribs 56 made from insulating material (e.g., plastic)) electrically separating the parallel connection contacts 48 and conducting structure (e.g., blade contacts 60) electrically connecting the series connection contacts 52. The illustrated mechanism is constructed and arranged so that the ribs 56 separate the parallel connection contacts 48 before the blade contacts 60 close the series connection contacts 52. For example, FIGS. 18A-18B illustrate the parallel connection contacts 48 being positioned forwardly of the series connection contacts 52 along an insertion axis 64 so that the parallel connection contacts 48 are engaged before the series connection contacts 52 would be engaged.

The illustrated configuring mechanism involves three insertion stages as the dual-mode battery pack 40 is slid onto a tool operating at a high voltage level:
  Insertion stage 1 (pre-insertion)
    The parallel connection contacts 48 are closed.
    The series connection contacts 52 are open.
  Insertion stage 2 (mid-insertion)
    The parallel connection contacts 48 are opened.
    The series connection contacts 52 remain open.
  Insertion stage 3 (battery pack 40 is electrically coupled
    to the tool 44)
    The parallel connection contacts 48 remain open.
    The series connection contacts 52 are closed.
  Likewise, the illustrated configuring mechanism involves three removal stages as the dual-mode battery pack 40 is removed from the tool operating at a high voltage level:
  Removal stage 1 (pre-removal)
    The parallel connection contacts 48 are open.
    The series connection contacts 52 are closed.
  Removal stage 2 (mid-removal; the battery pack 40 is
    electrically disconnected from the tool 44)
    The parallel connection contacts 48 remain open.
    The series connection contacts 52 are opened.
  Removal stage 3 (the battery pack 40 is removed from the
    tool 44)
    Parallel connection contacts 48 are closed.
    Series connection contacts 52 are open.

As noted in the preceding example, when a tool operating at a low voltage level is coupled to the dual-mode battery pack 40, the tool is configured to avoid interfering with or changing the normal condition of the contacts 48, 52 such that the pack 40 remains in a parallel configuration to output the low voltage level. To assist in doing so (see FIG. 20), the illustrated contacts 48, 52 (part of a switching terminal block 76) are recessed below a top surface of the battery pack housing 68.

The battery pack 40 includes a power terminal block 72 on a top portion of the housing 68 with positive and negative terminals (not shown) for connecting to the positive and negative terminal (not shown) of the power tool 44. In the example with low voltage operation, the tool engages the power tool terminal block 72, but not the switching terminal block 76.

In contrast, with high voltage operation, the tool engages both the power terminal block 72 (to engage the power terminals of the battery pack 40) and the switching terminal block 76 (to switch the pack 40 to the series configuration). Specifically, the configuring mechanism includes projections on which the ribs 56 and blade contacts 60 are supported to extend into the recessed portion below the top surface of the pack housing 60 to engage and change the condition of the contacts 48, 52.

Figure 13:
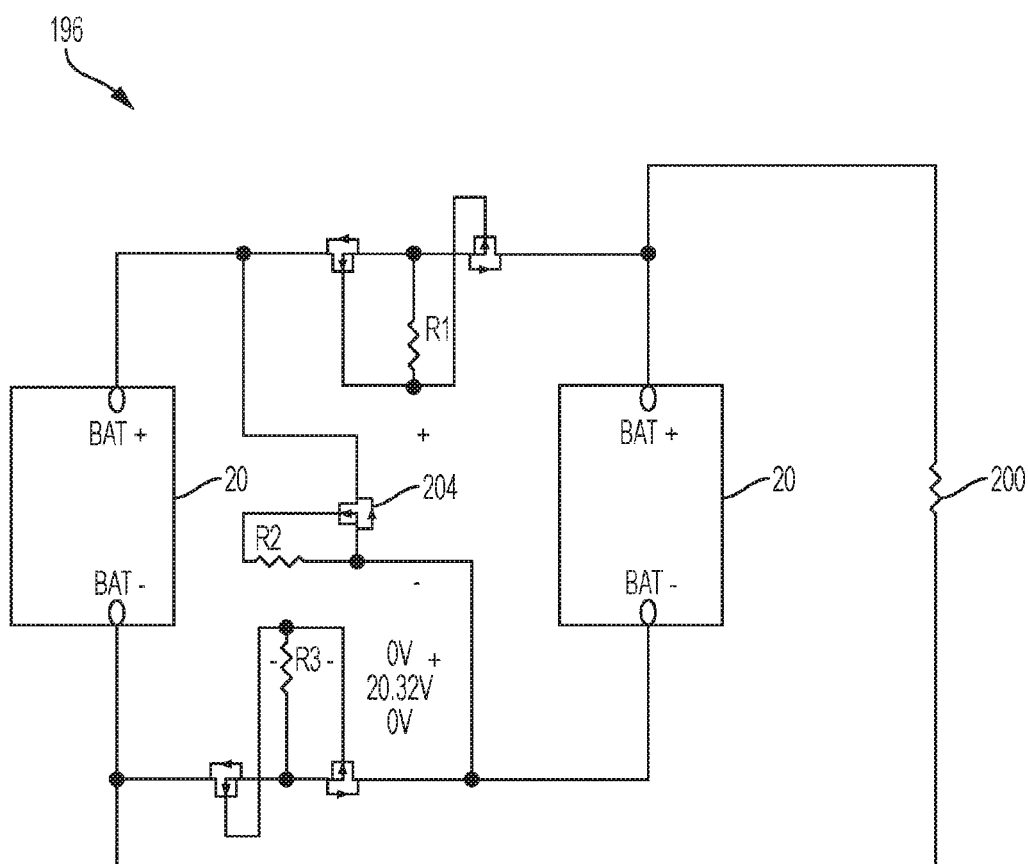
FIG. 13 is a circuit diagram of a further alternative construction of a battery pack.
Figure 14:
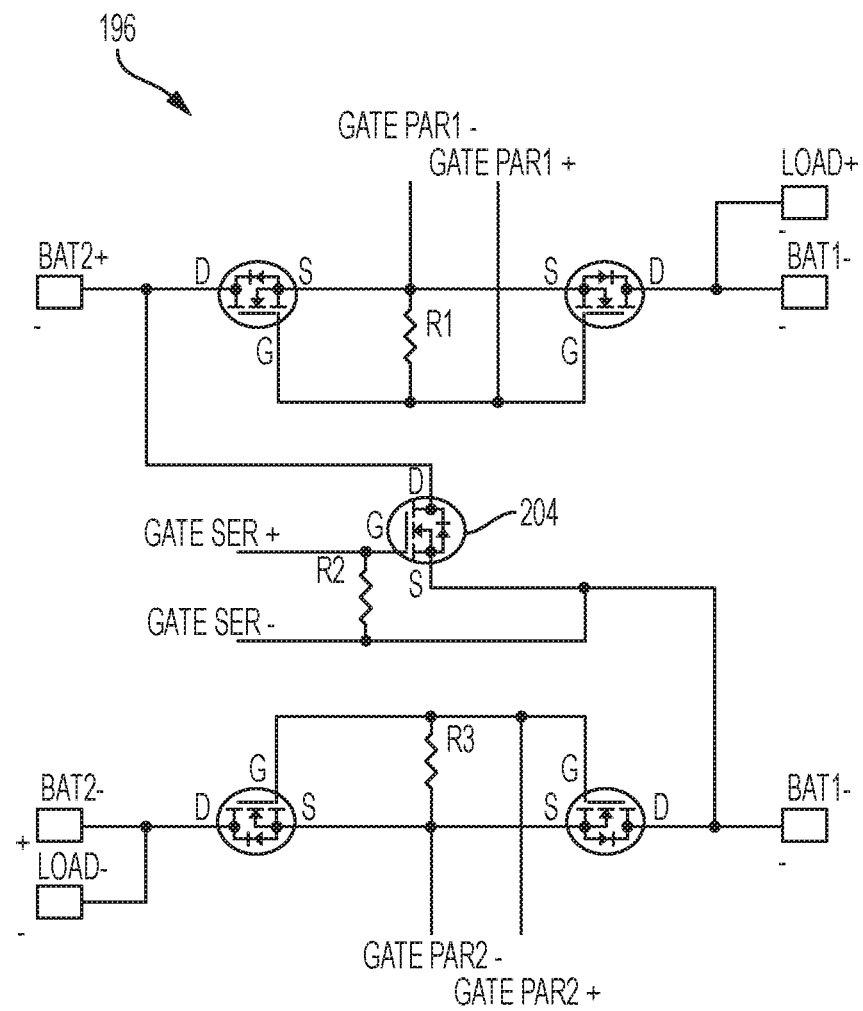
FIG. 14 is a circuit diagram of a PCB implementation of a battery pack.
Figure 15:
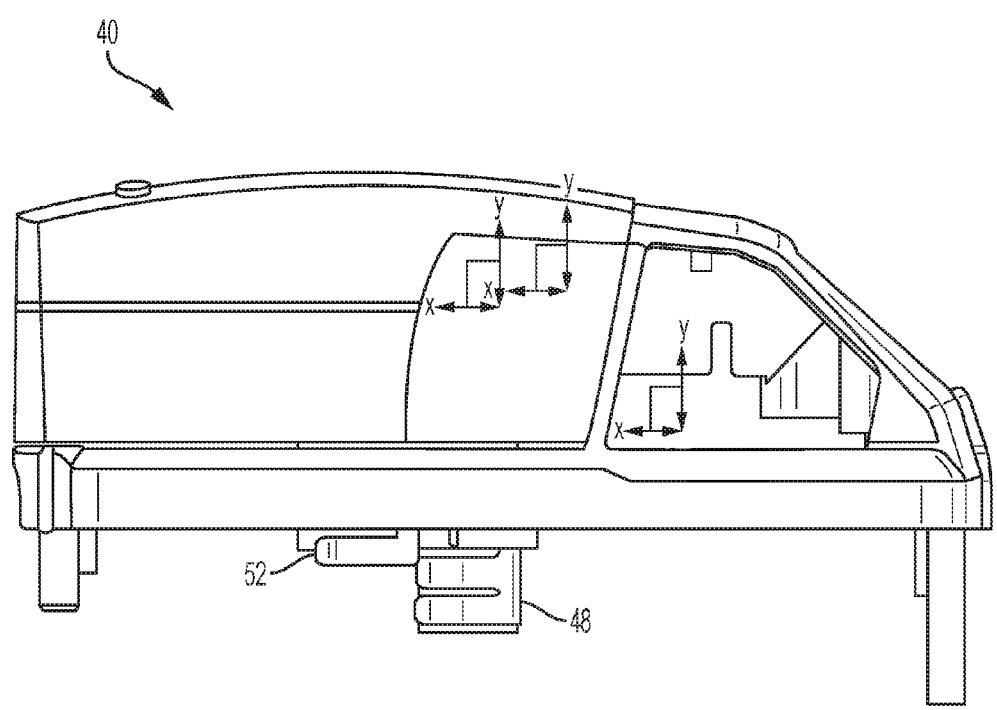
FIG. 15 is a side view of a battery pack.
Figure 16:
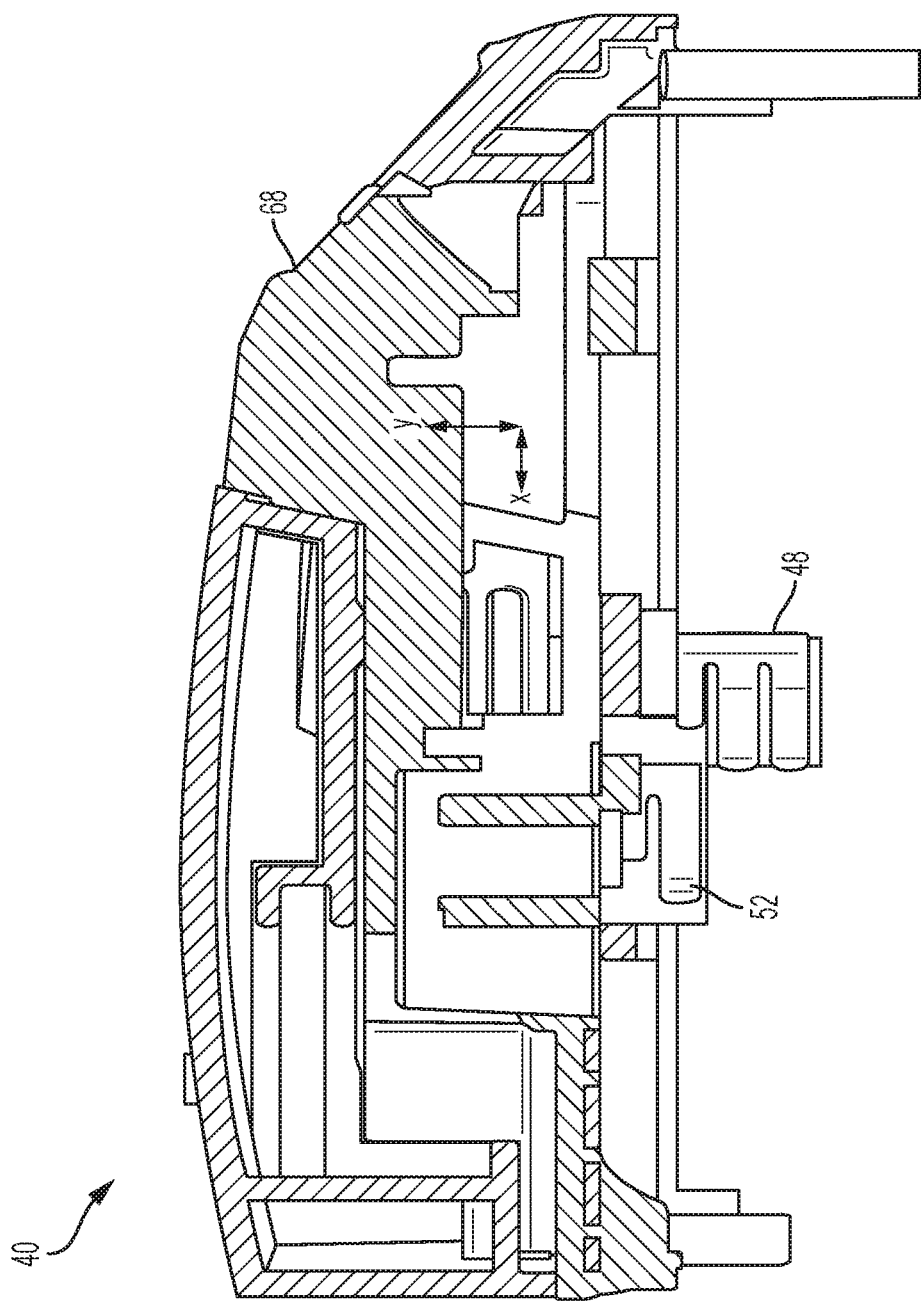
FIG. 16 is a partial cross-sectional side view of the top housing of the battery pack of FIG. 15.
Figure 17:
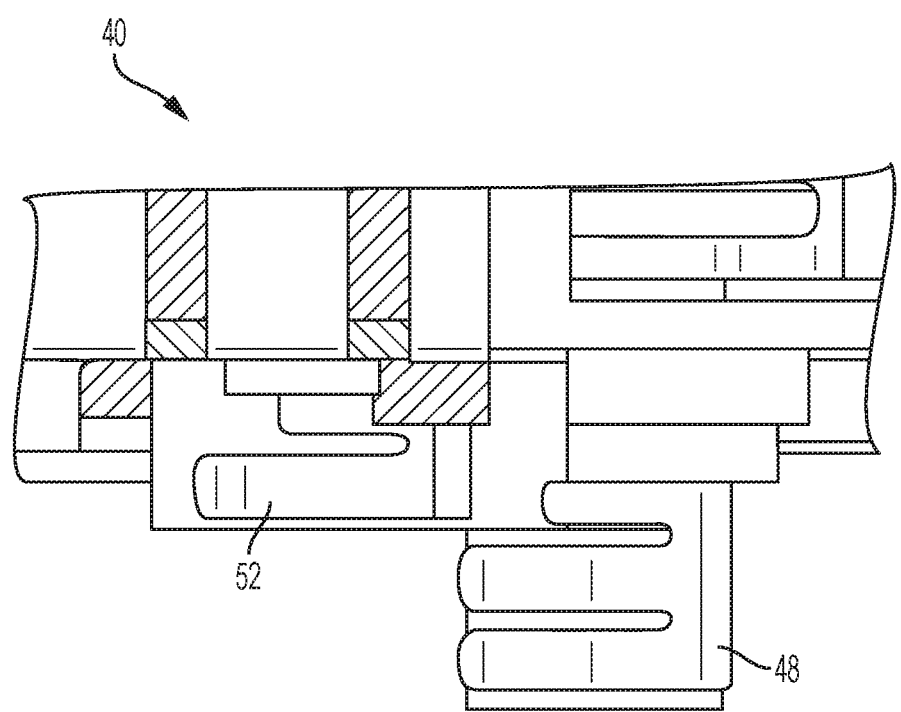
FIG. 17 is a partial cross-sectional side view of a portion of the top housing of the battery pack of FIG. 15.
Figure 20:
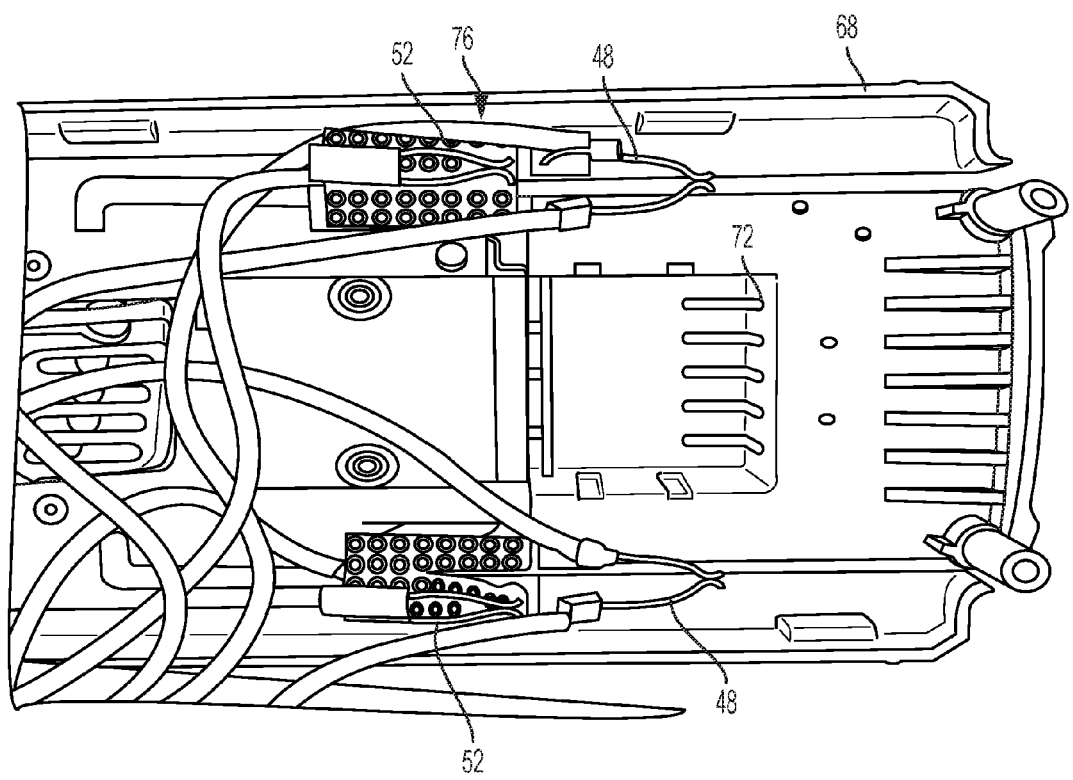
FIG. 20 is a bottom view of the top housing of the battery pack of FIG. 15, illustrating the mechanical contacts.

A rail system to guide a battery 40 onto a tool 44 may also be used for the mechanical construction of the switching battery (e.g., for embodiments of FIG. 6-14). As shown in FIG. 15, the contacts 48, 52 are shifted vertically as well as horizontally. The parallel connection contacts 48 axially toward the front are engaged and opened before the series connection contacts 52 toward the rear are closed. Furthermore, the vertical shift between the contacts 48, 52 allows for a gap for the configuring mechanism to be as narrow as possible. The contacts 48, 52 are further illustrated in FIGS. 16-20.

The illustrated contacts 48, 52 are mounted with perfboards. The parallel connection contacts 48 in the front are pressed into the material which surrounds the parallel connection contacts 48 to ensure that the parallel connection contacts 48 stay in position and maintain a spring tension. The parallel connection contacts 48 are opened by the insulating ribs 56 and spring closed to re-establish the parallel connection whenever the ribs 56 slide out to ensure an idle or default parallel configuration.

Figure 21:
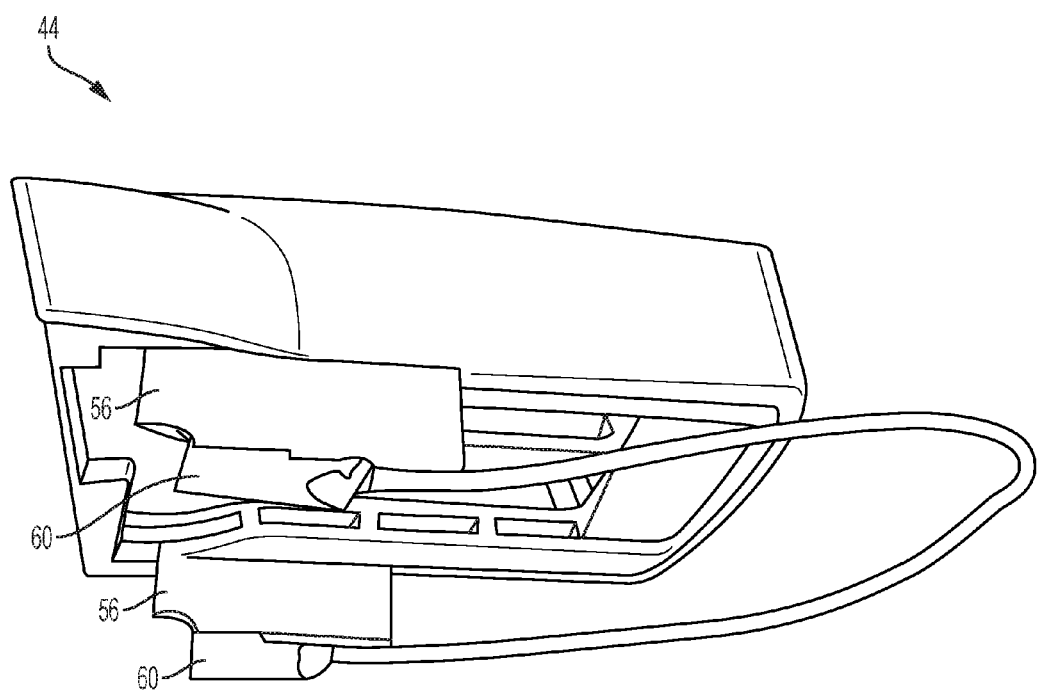
FIG. 21 is a bottom perspective view a top housing of a power tool.

A tool 44 operable at a high voltage level is partially shown in FIG. 21. The illustrated portion (e.g., the bottom of the handle) is engageable with the battery pack 40. As illustrated, the tool 44 includes a number of insulating elements (e.g., two plastic or polymer ribs 56. A number of conductors (e.g., two blade contacts 60) are provided rearwardly of and below the ribs 56.

Figure 22:
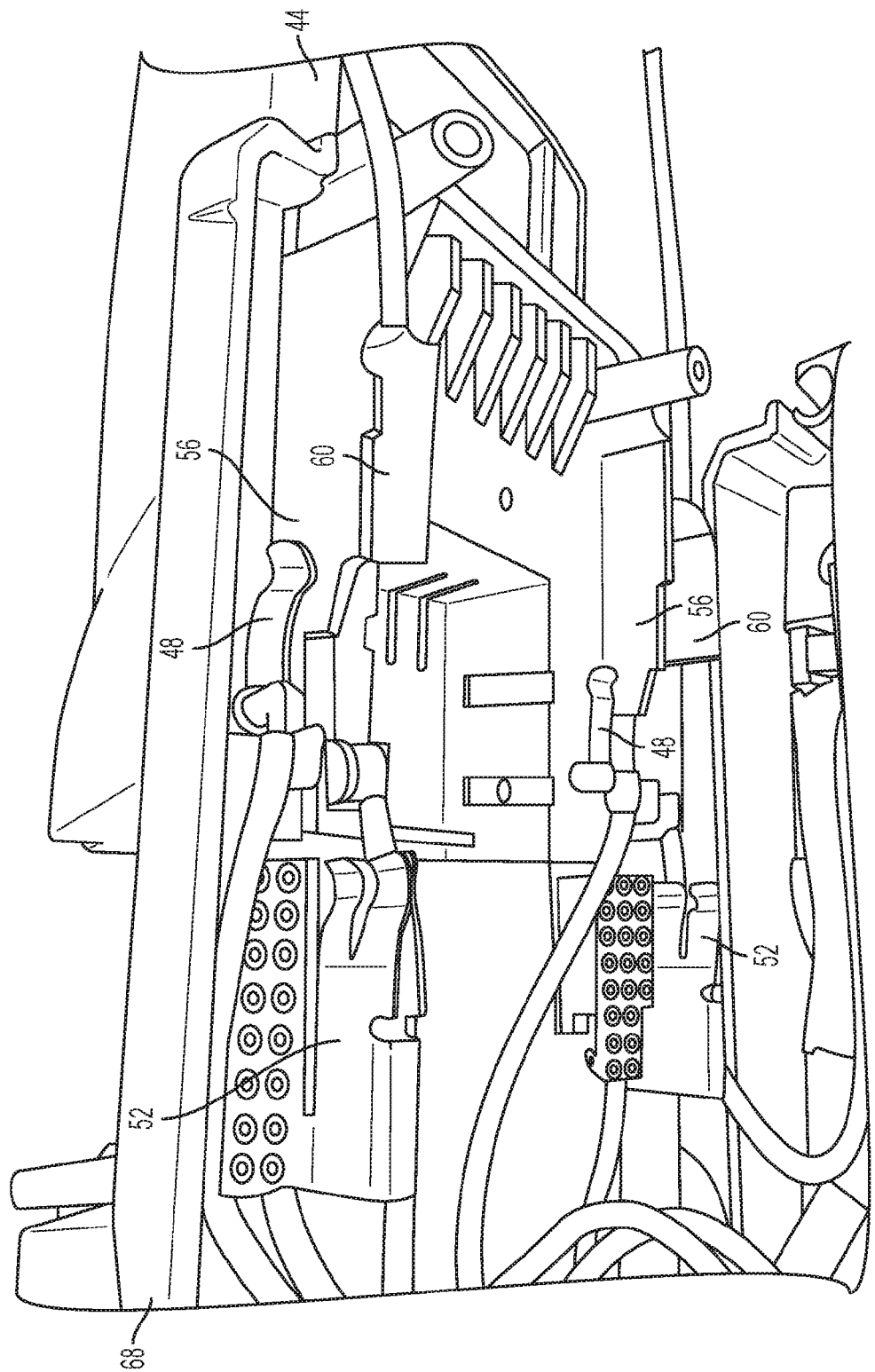
FIG. 22 is a bottom perspective view of an exemplary configuring mechanism between the battery pack of FIG. 15 and the power tool of FIG. 21.
Figure 23:
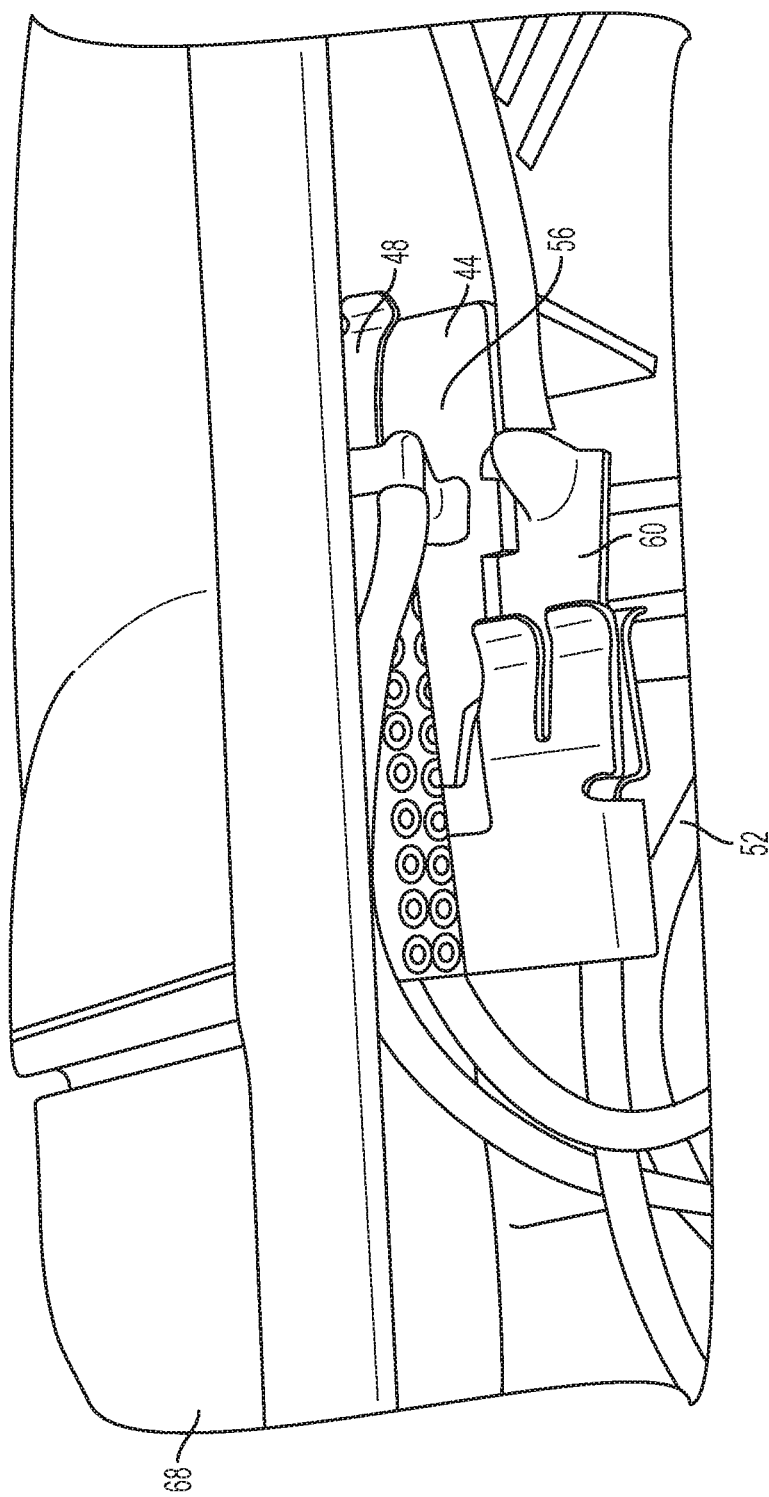
FIG. 23 is a bottom perspective view of another exemplary configuring mechanism between the battery pack of FIG. 15 and the power tool of FIG. 21.

FIGS. 22-23 illustrate engagement of the ribs 56 and contacts 60 on the tool 44 with the contacts 48, 52 of the battery pack 40. As illustrated, the ribs 56 split and separate the parallel connection contacts 48 while the blade contacts 60 close the series connection contacts 52. As described above, the ribs 56 and the contacts 60 are arranged such that the ribs 56 open the parallel connection contacts 48 before the blade contacts 52 close the series connection contacts 52.

Figure 29C:
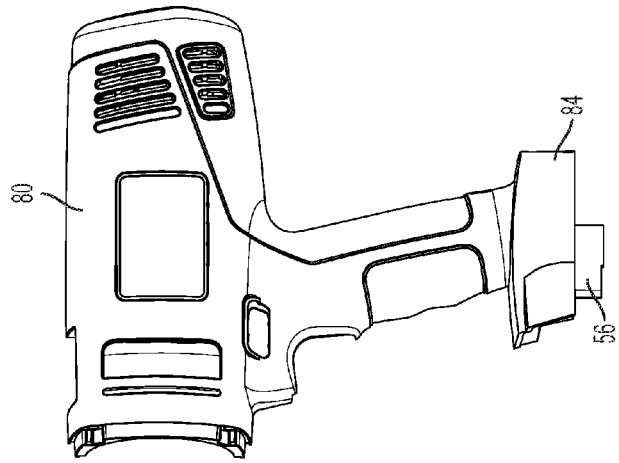
FIGS. 29A-29C are views of a housing half of a tool, such as a higher voltage (36V) tool.
Figure 29B:
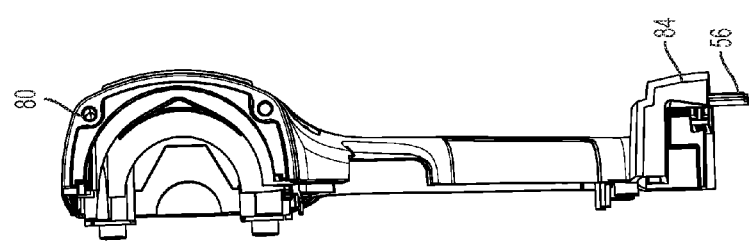
Figure 29A:
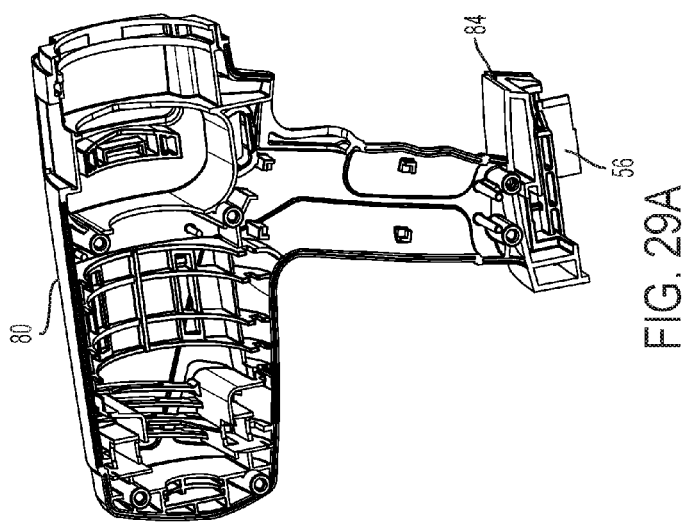
Figure 36C:
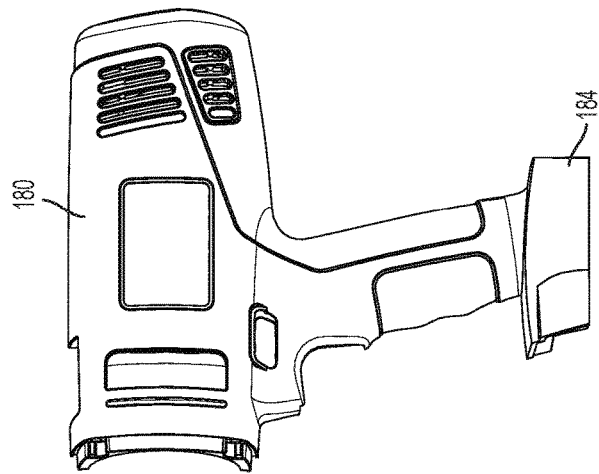
FIGS. 36A-36C are views of a housing half of a tool, such as a lower voltage (18V) tool.
Figure 36B:
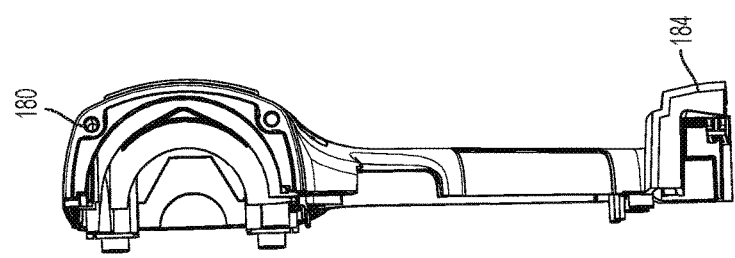
Figure 36A:
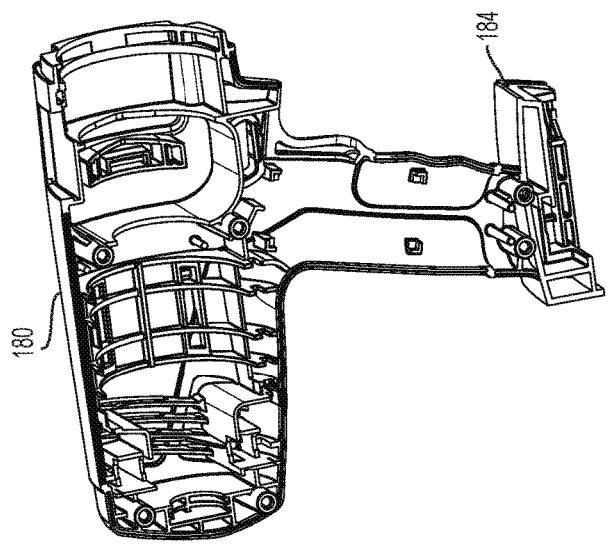

FIGS. 29A-29C illustrate a housing half 80 of a tool operating at a high voltage level. The housing half 80 includes a bottom handle portion 84 for receiving the battery 40. As shown, the handle portion 84 includes an insulating rib 56 for separating the normally-closed parallel connection contacts 48. FIGS. 36A-36C illustrate a housing half 180 of a tool operating at a low voltage level. The housing half 180 includes a battery handle portion 184 for receiving the battery 40. However, the handle portion 84 does not include insulating ribs or conductive blades.

In other constructions (not shown), the parallel connection contacts 48 and the series connection contacts 52 of the battery pack 40 are both normally open and in a non-connected state. When a tool operating at a low voltage is attached to the battery pack 40, blade contacts 60 of the tool close the parallel connection contacts 48, while the series connection contacts 52 remain open. When a tool operating at a high voltage is attached to the battery pack 40, blade contacts 60 of the tool close the series connection contacts 52, while the parallel connection contacts 48 remain open. In each case, the tool may also include insulating structure (e.g., ribs 56) to engage and insulate the contacts which will remain open (e.g., the series connection contacts 52 in the parallel configuration and the parallel connection contacts 48 in the series configuration).

Figure 7:
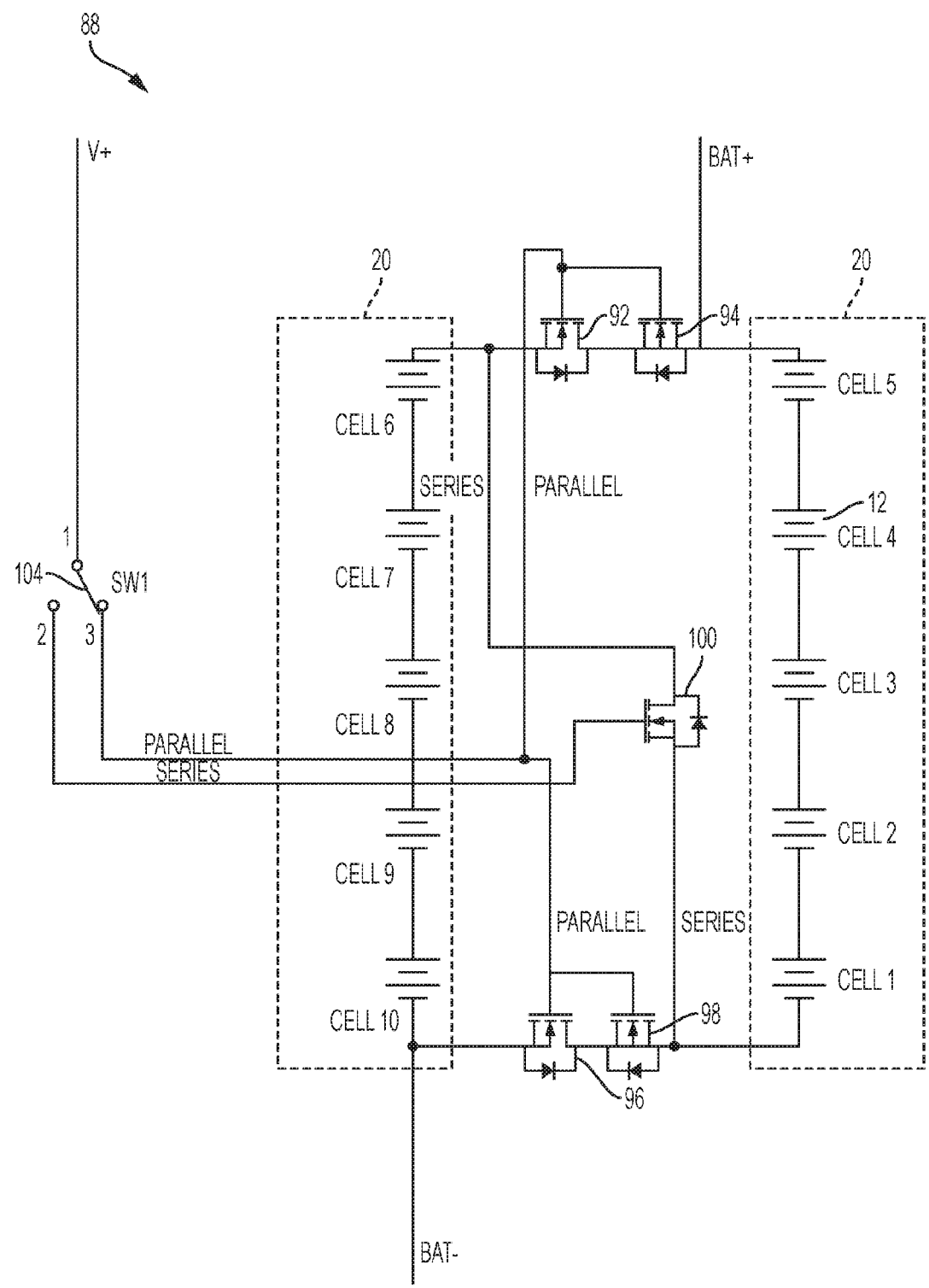
FIG. 7 is a circuit diagram of an alternative construction of a battery pack.

FIG. 7 illustrates an alternative circuit 88 for selectively connecting cells 12 in the parallel and series configurations. A different configuring mechanism between the tool 44 and the battery pack 40 includes a number of switches (e.g., five switches 92, 94, 96, 98, and 100) instead of the connection contacts 48, 52 of FIG. 6. Compared to FIG. 6, the number of contacts may be reduced to one or two contacts.

The switches 92, 94, 96, 98, and 100 may have switching times in the nanosecond range, and the pack 40 may be designed such that the first contact opens as soon as the pack 40 starts to engage the tool and closes the second contact when the battery pack 40 and the tool are fully engaged. This arrangement will ensure that there is sufficient time between the connections to prevent a short circuit.

A changeover device (e.g., a lever 104) on the pack 40, which may have one contact actuated or triggered by the tool, may be used to implement switching between series and parallel configurations. In the illustrated construction, the switches 92, 94, 96, and 98 for the parallel configuration are normally on based in a default position of the changeover lever 104, and the switch 100 for the series connection is normally off. As the lever 104 switches positions, the switches 92, 94, 96, and 98 for the parallel connection are turned off, and, some time thereafter, the switch 100 for the series connection is turned on so that the pack 40 is then switched to a series configuration.

Such a construction may accommodate, without any structural changes, existing tools operating at a low voltage (e.g., 18V tools) with the parallel configuration of the battery pack 40. Also, it may be possible to drive the switches 92, 94, 96, 98, and 100 with low power.

Within a predefined state, a normally-closed contact may remain closed and drive the switches 92, 94, 96, and 98 for the parallel configuration. As a tool operating at a high voltage is engaged, the lever 104 may be triggered, for example, by sliding, by triggering a sensor (e.g., a reed contact (not shown)), etc. The lever 104 switches from the 1-3 connection to 1-2. The parallel circuit is opened, and, thereafter, the series circuit is closed. At this point, switches 92, 94, 96, and 98 are off, and switch 100 will be driven by positive power supply V+. The result is that the cells 12 are switched from the 5S2P configuration to a series 10S1P configuration. The battery pack 40 outputs the high voltage level, and the tool operates at that voltage level.

Figure 8:
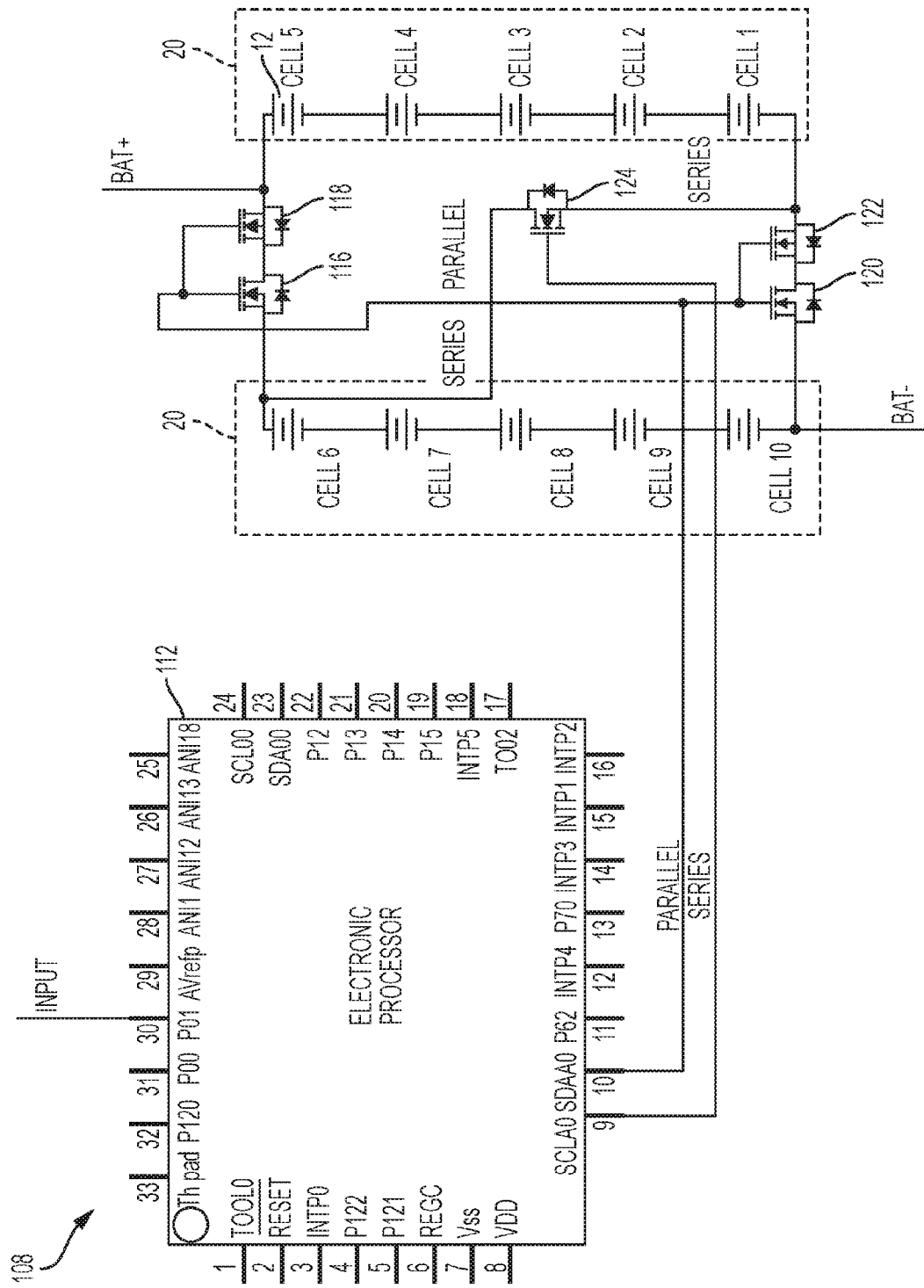
FIG. 8 is a circuit diagram of another alternative construction of a battery pack.

FIG. 8 illustrates another alternative circuit 108 for selectively connecting cells 12 in the parallel and series configurations. An electronic processor 112 and a number of switches (e.g., three switches 116, 118, 120, 122, and 124) are operable to configure the cells 12 in the parallel and series configurations. In the illustrated embodiments, the lever 104 is replaced by the processor 112. Two standard input and output pins (standard I/O) may be used to drive the switches 116, 118, 120, 122, and 124.

The circuit 108 operates in a manner similar to the circuit 88 of FIG. 7. The circuit 108 remains in a predefined state, in which the circuit 108 is driven by the processor 112 in parallel to establish a low voltage configuration. As soon as tool operating at a high voltage engages the battery pack 40, an input of the processor 112 is triggered to change the configuration of the circuit 108 to a series, high voltage level configuration.

During the predefined state, the switches 116, 118, 120, and 122 are driven by the processor 112. As soon as the input at Pin 30 is triggered, the processor 112 can set Pin 10 to low and Pin 9 to high, to drive the switch 124 for the series circuit configuration. Programming of the processor 112 allows desired timing of the opening of the switches 116, 118, 120, and 122 before closing of the switch 124.

This system allows a dynamic solution, for example, if the tool (or other electrical device) is operable at both the low voltage level and the high voltage level (e.g., if a motor of the tool is able to operate at both the low voltage level (e.g., 18V) as well as at the high voltage level (e.g., 36V)). Efficiency and/or operation of the tool may be improved by selecting (e.g., automatically based on operational characteristics, manually based on user input, etc.) the optimal or desired operating voltage level.

In some constructions, Pin 30 of the processor 112 may be set to high and may be used as a user input (e.g., a user driven switch (not shown)). When a motor of the tool 44 or the load of another electrical device can operate under both the low voltage level and the high voltage level, the user driven switch may be used to select the series or parallel configuration.

In some constructions, an input of the processor 112 may also be driven by a tool sensor (e.g., a reed contact (not shown)). The circuit 108 with the processor 112 may remain in parallel, low voltage configuration as long as the reed contact input of the processor 112 is not triggered. An activator for the tool sensor (e.g., a magnet for the reed sensor) may be provided for the tool operating at a high voltage. When the tool 44 approaches or engages the pack 40, the magnet may trigger the reed contact to cause the processor 112 to configure the cells 12 from the parallel, low voltage configuration to the series, high voltage configuration. It should be understood that a similar sensor/activator (e.g., reed contact and magnet) may be used as the lever 104 in the circuit 88 of FIG. 7.

In some constructions, a transponder/near field communication (NFC) system may trigger an input of the processor 112 in the battery pack 40 to configure the cells 12 between the parallel and series configurations. Typical NFC tags contain data between 48 bytes and 8 kilobytes (kB), which may establish a unique manufacturer specific technique to clearly identify a tool operating at a high voltage level.

In some constructions, the tool sensor or the transponder/NFC approach may be used in conjunction with the user selection approach. A user input may be ignored if the processor 112 determines from a tool sensor transponder that the tool is not operating at or capable of operating at high voltage level in a series configuration of the battery pack 40. In yet other embodiments, the user input may also be used to override data from the tool sensor/transponder.

In some constructions, the tool 44 may direct configuration of the cells 12 between the parallel and series configurations. The tool 44 may include a data connection to the battery pack 40 to control the switches 116, 118, 120, 122, and 124 in the battery pack 40. The tool 44 may transmit information regarding the optimal configuration of the cells 12 based on the construction of the tool (e.g., a motor capable of operating only in one of the parallel and series configurations), the current or desired operational conditions of the tool (e.g., a high voltage requirement, a desired increased run-time/capacity, etc.), etc. The battery pack 40 may then, based on the information received from the tool 44, reconfigure the connection of the cells 12 between the parallel and series configurations.

In some constructions, separate sensors may trigger selection of the parallel configuration and of the series configuration. For example, a sensor (e.g., a Hall effect sensor) may be used in one component (i.e., the tool 44 or the battery pack 40) to detect the presence or absence of a sensed element (e.g., a magnet) in the other component. Detection of the magnet causes configuration of the battery pack 40 in one of the series or parallel configurations, and determination of the absence of the magnet causes configuration of the battery pack 40 in the other of the series or parallel configuration.

In another example, one or more sensors (e.g., Hall effect sensors) in one component may detect the location or orientation (rather than merely the presence) of one or more sensed elements (e.g., magnets) in the other component to determine whether to configure the battery pack 40 in the series or parallel configuration.

Other sensors (e.g., mechanical, optical, electrical, magnetic, inductive sensors, etc.) may also be used to trigger configuration of the cells 12 in the series or parallel configurations. The output of the applicable sensor(s) is provided to the processor 112, which configures the battery pack 40 in the series or parallel configuration.

Figure 9:
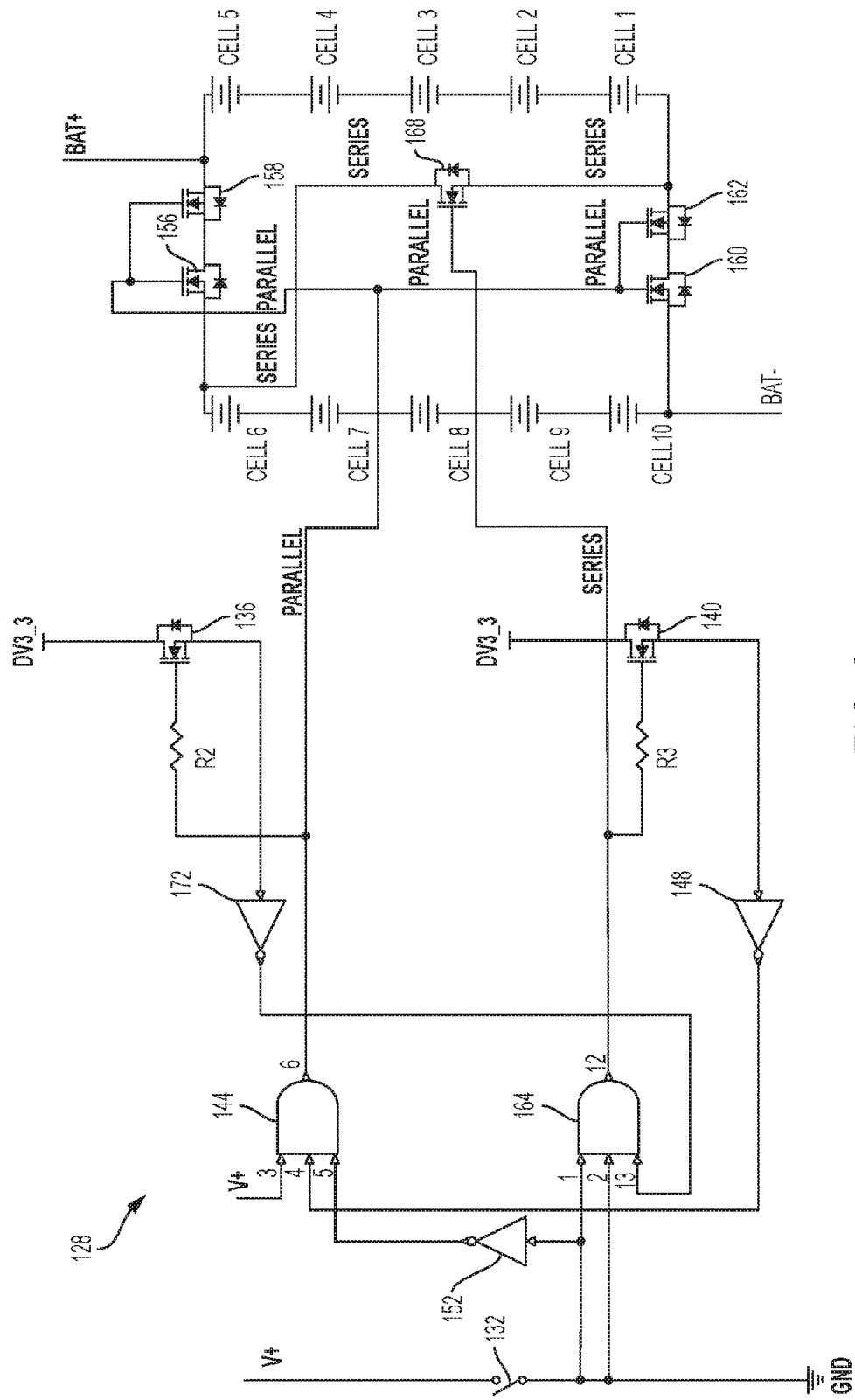
FIG. 9 is a circuit diagram of yet another alternative construction of a battery pack.

FIG. 9 illustrates yet another alternative circuit 128 for selectively connecting cells 12 in the series and parallel configurations. A combination of digital gates (for example, AND gates and inverters) may be used to switch the circuit 128 between series and parallel connection. Within the idle state the parallel circuit is connected and as soon as a contact (in this case, a switch 132) is closed, the circuit switches from the parallel connection to the series connection. In some embodiments, switches 136 and 140 with resistors R2 and R3 may be used to determine whether the parallel or series circuit is completely switched off to prevent a short circuit.

In the illustrated embodiment, an AND gate 144 may be activated with help of inverters 148 and 152. When the AND gate 144 is activated, switches 156, 158, 160, and 162 are turned ON, and the battery pack 40 is in a parallel configuration. Further, the AND gate 144 may also activate an active delay circuit driven by switch 136. The active delay circuit over switch 136 may be used to prevent an AND gate 164 from turning ON.

When the switch 132 is triggered, the inverter 152 changes from high to low, and an output of the AND gate 144 is switched OFF. At the same moment, the AND gate 164 gets two high signals, but the AND gate 164 may not be turned ON before the switch 136 is turned off. At this point, the circuit 128 swaps the active and inactive lines, and the output of the inverter 148 changes from high to low, which may be used to prevent the AND gate 144 from turning ON. In this embodiment, five switches 156, 158, 160, 162, and 168 provide a trigger sequence that closes the switch 132 and may be used to switch between series and parallel configurations. The trigger may operate with a single contact, such as the sensor, the reed contact or the transponder/NFC system, described above.

In the examples of FIGS. 7-9, the switches 92, 94, 96, 98, 100, 116, 118, 120, 122, 124, 156, 158, 160, 162, and 168 are illustrated as metal-oxide-semiconductor field-effect transistors (MOSFETs). Other switches, such as bipolar junction transistors (BJTs), relay switches, etc., may be used instead of MOSFETs for the switches 92, 94, 96, 98, 100, 116, 118, 120, 122, 124, 156, 158, 160, 162, and 168.

Figure 10:
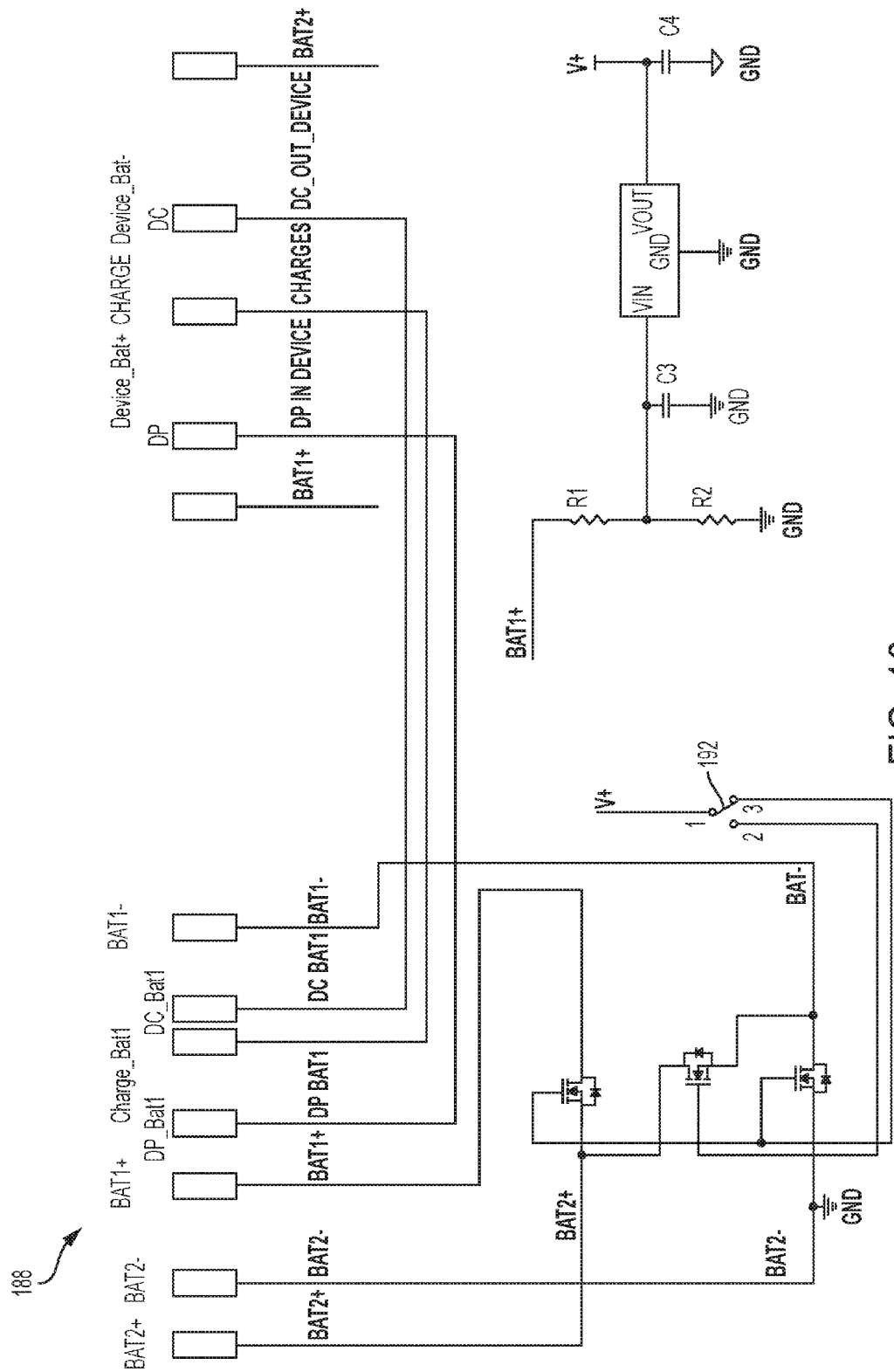
FIG. 10 is a circuit diagram of a further alternative construction of a battery pack.

FIG. 10 illustrates a circuit 188 in which a switch 192 is mounted on the outside of the tool 44 or the battery pack 40 to switch the circuit 188 between the parallel and series configurations.

Figure 11:
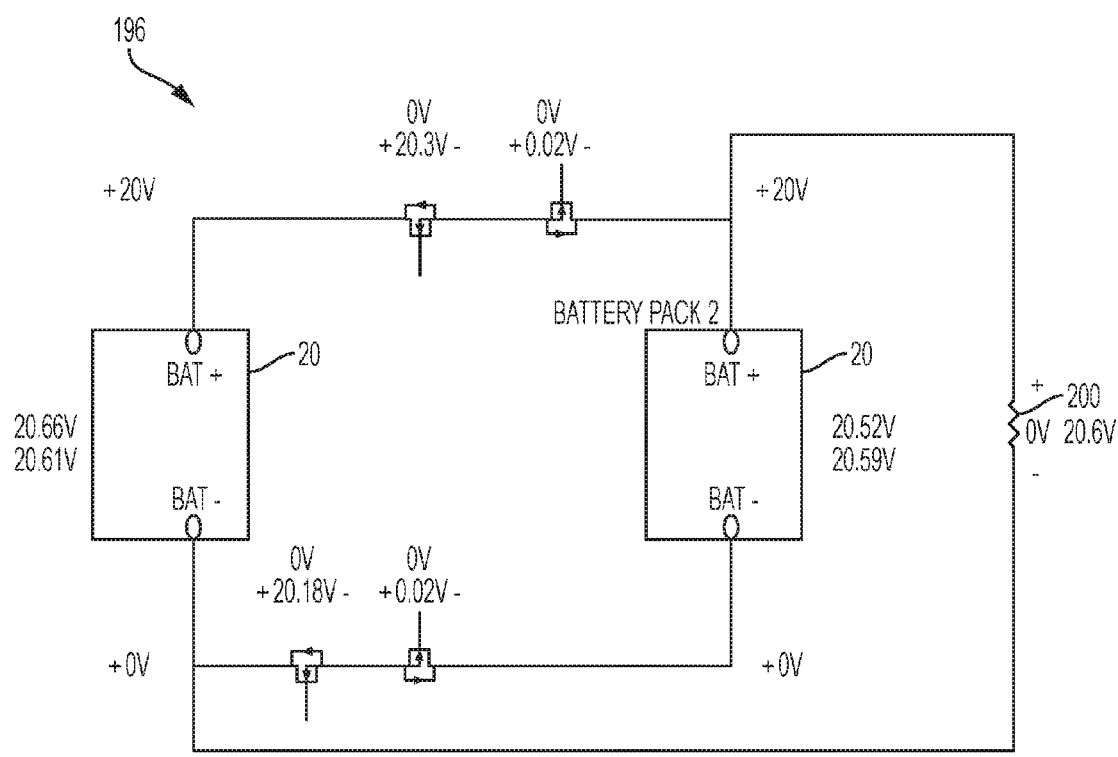
FIG. 11 is a circuit diagram of another alternative construction of a battery pack.

A transistor circuit may be used to switch the cells 12 between the parallel and series configurations. FIG. 11 illustrates an example transistor circuit 196 in a parallel configuration with two transistors for each path. As illustrated, the idle state of the circuit 196 has zero volts over the load resistance 200 and almost the whole battery voltage over one transistor in each path. As soon as the circuit gets switched (all transistors switch together), the voltage drop over all transistors equals zero. Furthermore, the battery voltages are changing and converge closer together. In addition to that, the load resistance 200 shows a voltage drop with 20.6V. As a result, the battery pack 40 is connected in a parallel configuration.

Figure 12:
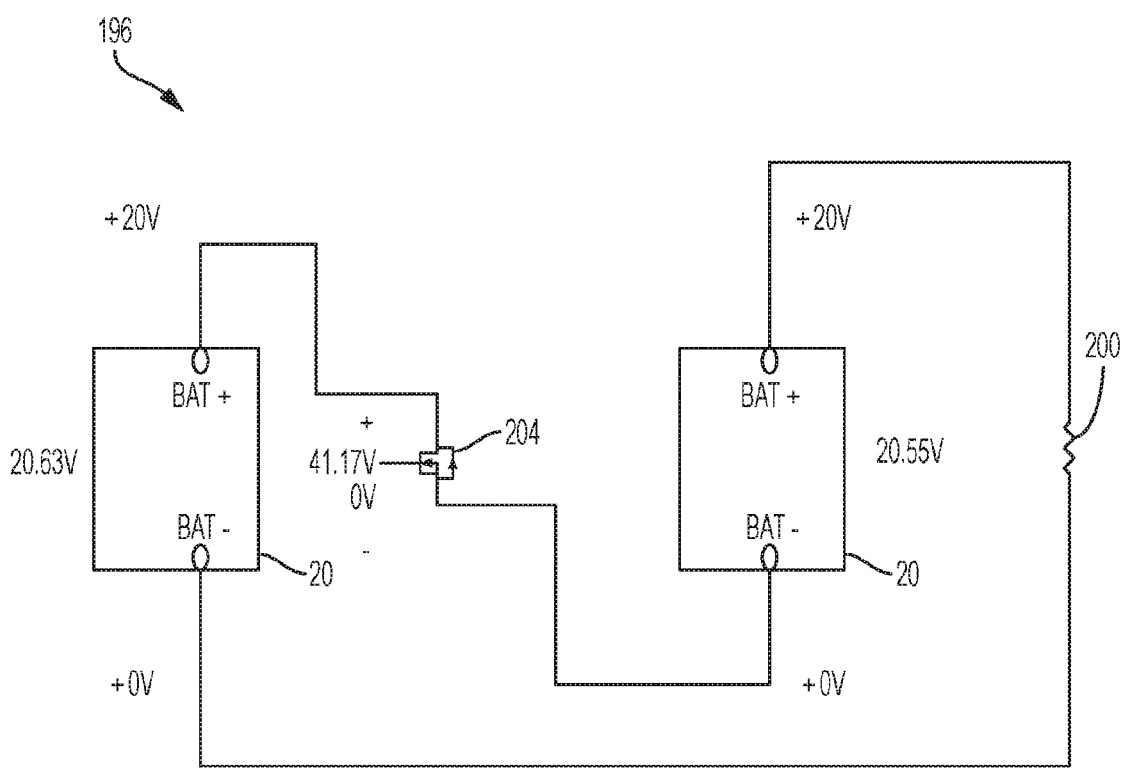
FIG. 12 is a circuit diagram of yet another alternative construction of a battery pack.

FIG. 12 illustrates the transistor circuit 196 with the battery pack 40 in a series configuration. As illustrated, the idle state the circuit 196 shows no voltage drop over the load resistance 20 and a voltage drop of 41.17V over a transistor 204 in the middle, meaning that the transistor 204 is not switched in the idle state. As soon as the transistor 204 (and with it the circuit) is switched, the voltage drop over the transistor 204 goes to zero, and the voltage drop over the resistor 200 changes from zero to 41.17V.

The transistor circuit 196 of FIGS. 11-12 is also illustrated in FIG. 13. FIG. 14 shows a printed circuit board implementation of the circuit 196.

In some embodiments of the battery pack 40, the battery cells 12 may be monitored by one or more monitoring integrated circuits (ICs) to, for example, protect and extend the life of the cells 12 and of the battery pack 40. The cells 12 may be monitored to, for example, prevent or inhibit overvoltage, undervoltage, overcurrent in discharge, imbalance, etc. of the cells 12.

When a complete block 20 of cells 12 is monitored by connecting a monitoring device between the most positive terminal and the most negative terminal of the block 20, a total voltage of the block 20 is monitored but not the individual cells 12. In such embodiments, the monitoring device may detect a reasonable value for the voltage of the block 20 but may not detect undesirable conditions of the cells 12 (e.g., cell imbalances) within the block 20. Hence, monitoring ICs capable of monitoring individual cells in a block 20 may be advantageous.

Individual cell monitoring may be implemented to balance the cells during charging and discharging. For example, during charging, one cell 12 may reach a threshold of approximately 4.2V before others cells 12, the monitoring IC may cut off charging of that cell 12, but charging of other cells 12 will continue, for example, with a slightly higher current to reach the same threshold.

Figure 24:
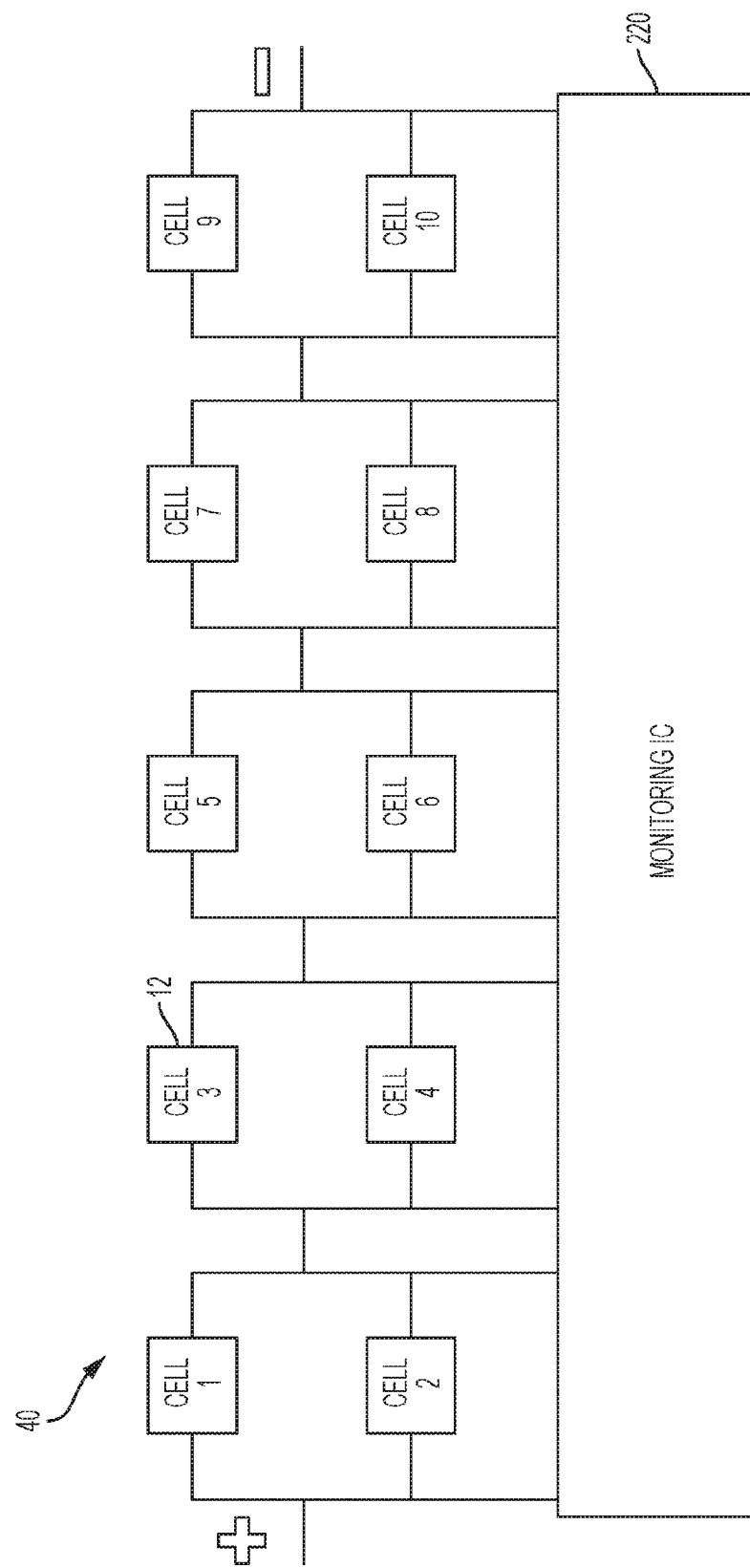
FIG. 24 is a block diagram of a battery monitoring circuit of a battery pack.

FIG. 24 illustrates a monitoring IC 220 of the battery pack 40 connected to the battery cells 12. As illustrated, the monitoring IC 220 does not monitor each cell 12 individually because connections to the individual cells 12 are missing. While the monitoring IC 220 may monitor the cells 12 collectively from positive to negative, it is not be capable of monitoring individual cells 220.

The battery cells 12 may provide a supply voltage to the monitoring IC 220. Accordingly, the monitoring IC 220 may need to be connected to the battery blocks 8 or 20. When the battery pack 40 switches configurations, the supply voltage for the monitoring IC 220 will also switch between a low voltage level and a high voltage level. Exemplary designs are provided below to allow for monitoring cells individually and to handle the switching power supply voltage.

Figure 25:
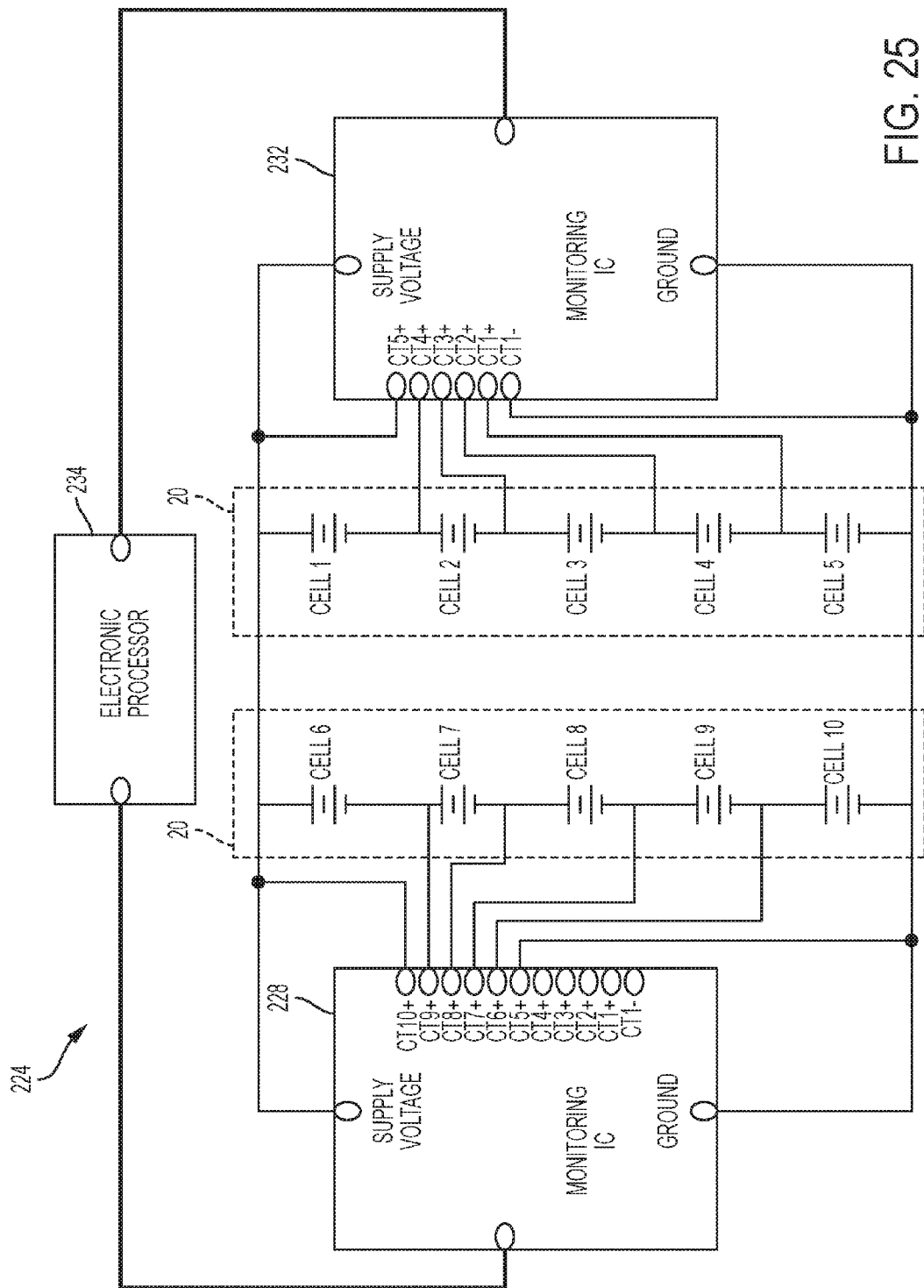
FIG. 25 is a block diagram of a battery monitoring circuit of a battery pack in a parallel configuration.

FIG. 25 illustrates an exemplary battery monitoring circuit 224 in a parallel configuration. In the illustrated embodiment, the battery monitoring circuit 224 includes two separate monitoring ICs 228 and 232 communicating with an electronic processor 234. In some embodiments, two monitoring ICs 228 and 232 may be implemented using host-controlled analog front ends (AFEs) capable of monitoring up to six or up to ten cells connected in series.

The monitoring IC 228 may be used to monitor all ten cells 12 in a series configuration while the monitoring IC 232 may be disconnected from the cells 12, so that the monitoring IC 232 is not turned ON by the cell voltages. Furthermore, both monitoring ICs 228 and 232 may be connected to the negative pole of the last cell 12 (for example, cell 10), since this point serves as the star ground for the setup.

Figure 26:
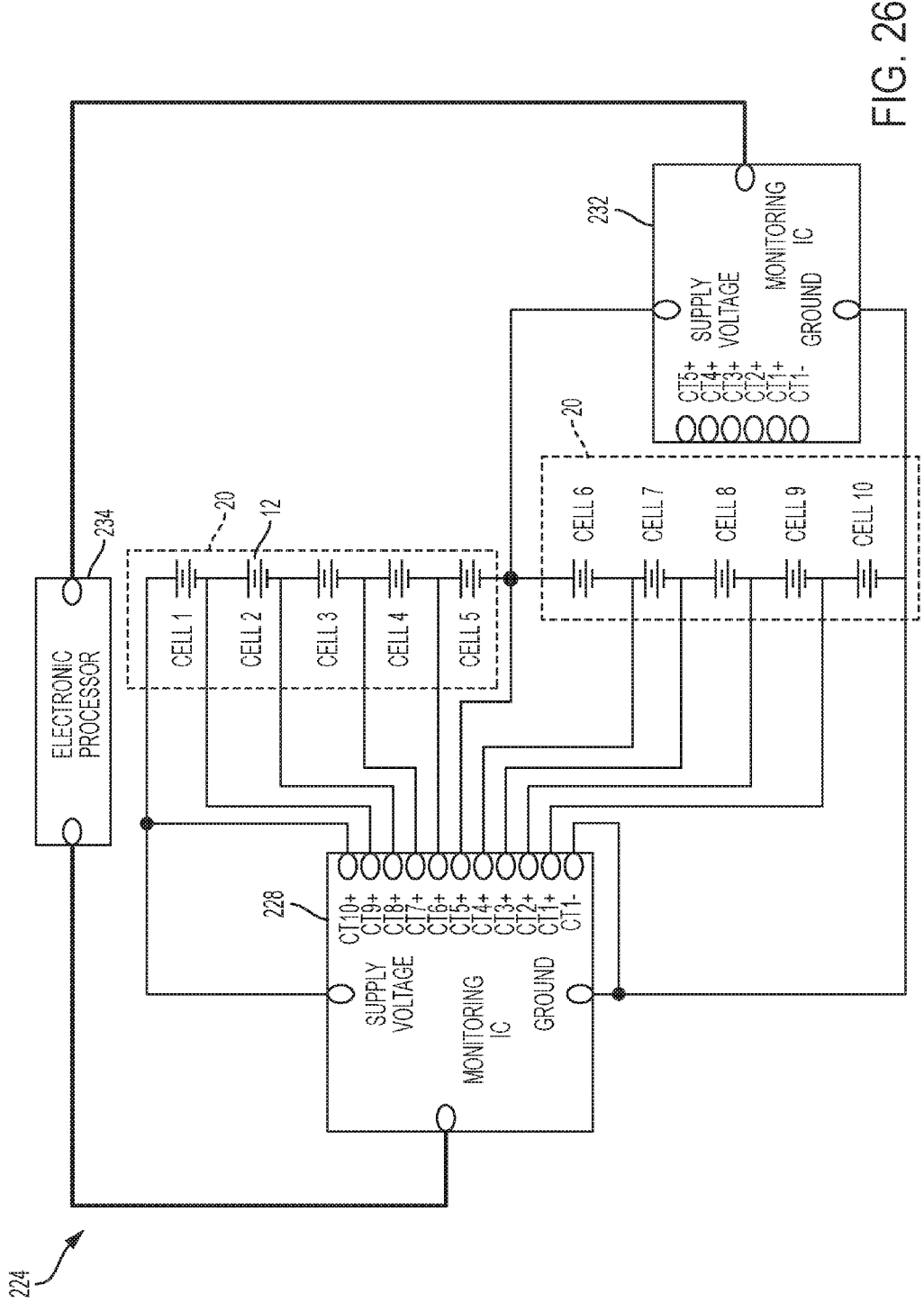
FIG. 26 is a block diagram of the battery monitoring circuit of FIG. 25 in a series configuration.

FIG. 26 illustrates the battery monitoring circuit 224 in a series configuration. In this configuration, the monitoring IC 232 may be unused, as it may only be used to monitor cells 12 in a parallel setup. Further, the monitoring ICs 228 and 232 may be designed to operate with fluctuating supply voltages to handle changing voltage levels resulting from switching between the parallel and series configurations.

Figure 27:
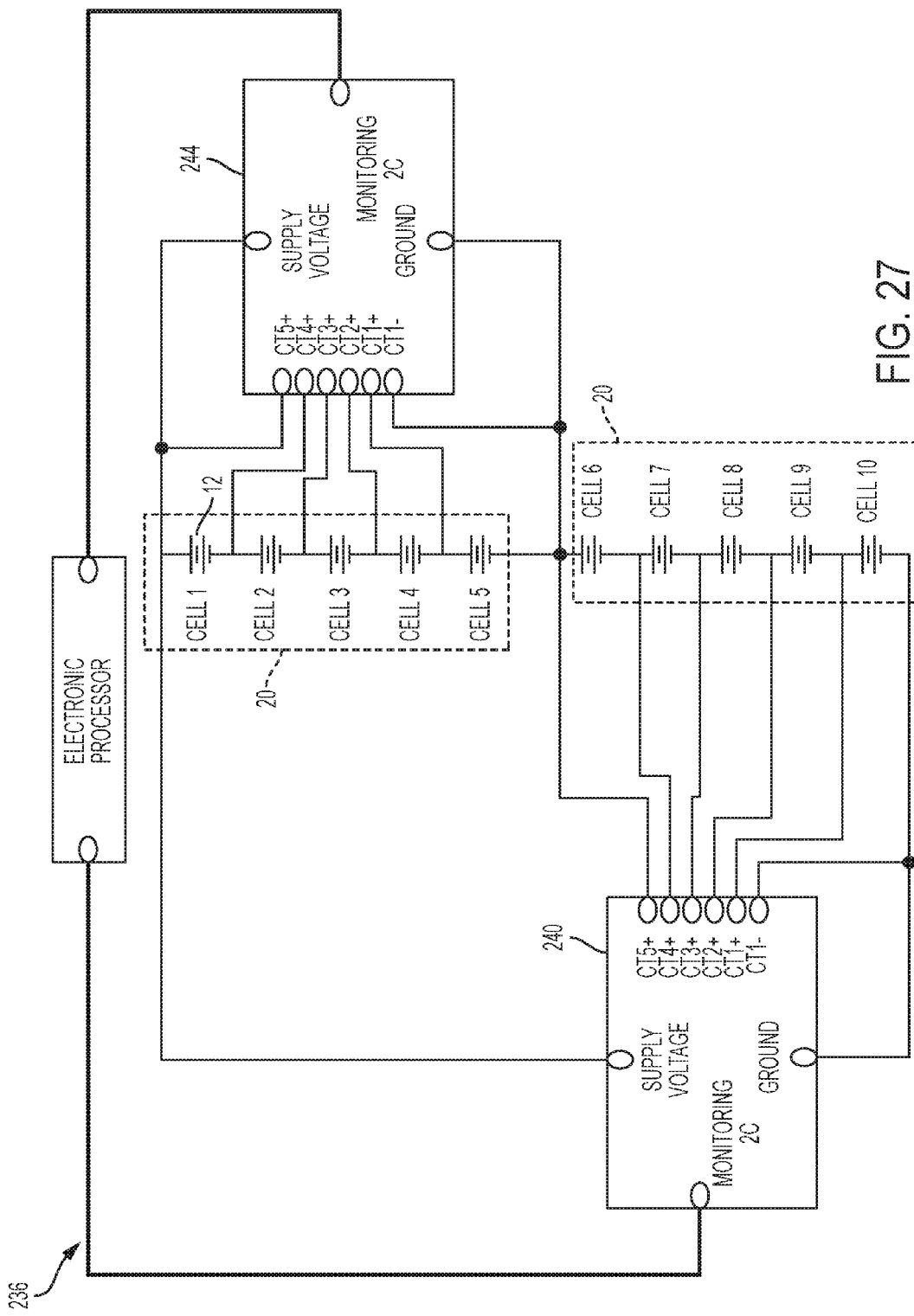
FIG. 27 is a block diagram of a battery monitoring circuit of a battery pack in a series configuration.

FIG. 27 illustrates another exemplary battery monitoring circuit 236 in a series configuration. The battery monitoring circuit 236 is similar to the battery monitoring circuit 224 of FIG. 25, but two monitoring ICs 240 and 244 monitor five cells 12 each. The monitoring IC 240 is connected from Cell 10 through Cell 6, and the monitoring IC 244 is connected from Cell 5 through Cell 1. Due to this connection, the monitoring IC 244 is connected between +36V and +18V whereas the monitoring IC 240 is connected between +18V and 0V such that both monitoring ICs 240 and 244 receive similar operating voltages. Both monitoring ICs 240 and 244 are connected to an electronic processor 248, which may be used to synchronize the monitoring ICs 240 and 244.

Figure 28:
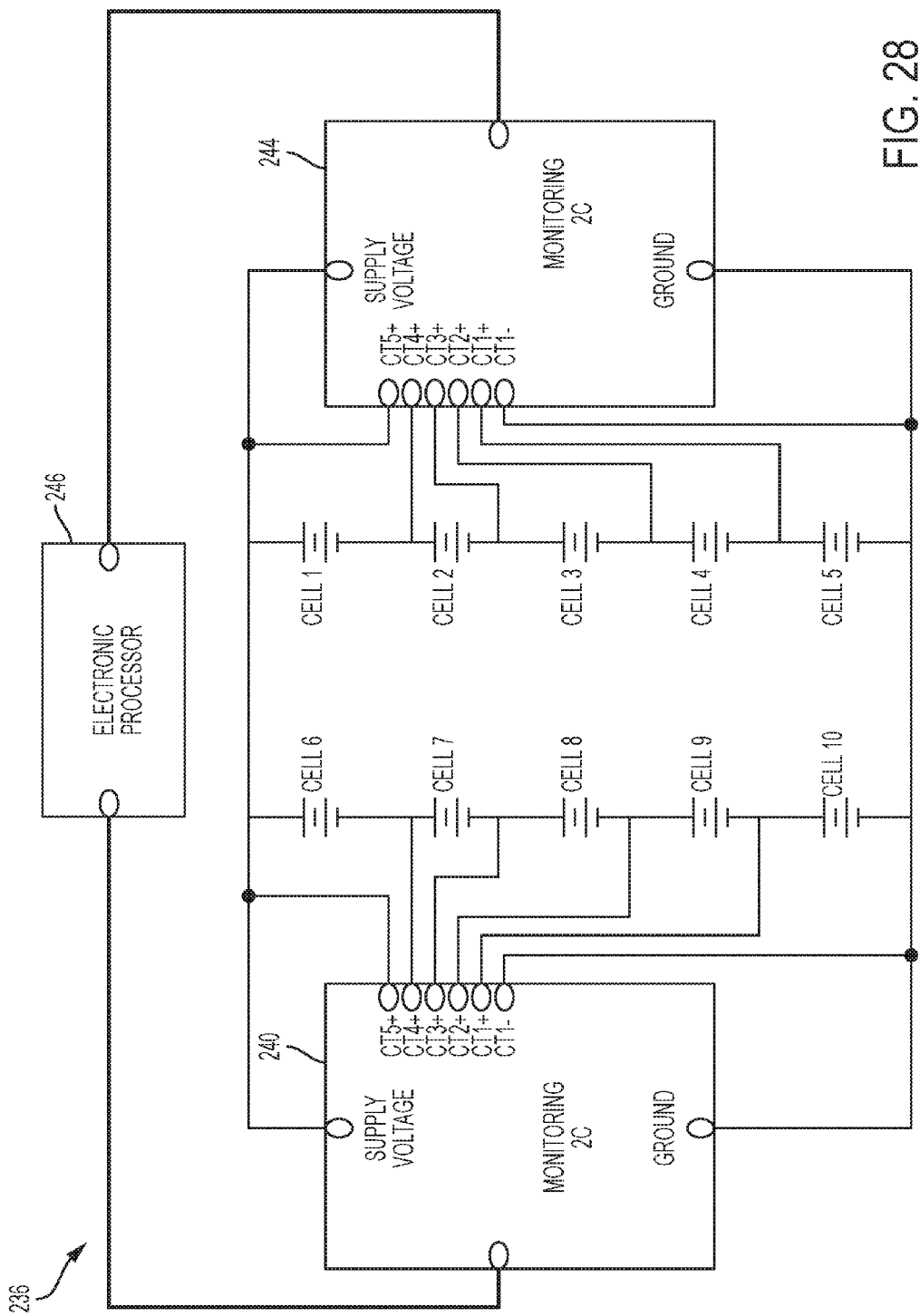
FIG. 28 is a block diagram of the battery monitoring circuit of FIG. 27 in a parallel configuration.

FIG. 28 illustrates the battery monitoring circuit 236 in a parallel configuration. As illustrated, both monitoring ICs 240 and 244 are connected between +18V and 0V, and, therefore, no additional changes are required to the operating voltages of the monitoring ICs 240 and 244 when the battery pack 40 switches between the parallel and series configurations.

In other embodiments, rather than multiple monitoring ICs each connected to one block 20 of cells 12, a single monitoring IC may monitor a block 20 of battery cells 12 for a short time and then jump to monitor a second block 20 for a similar time period. Particularly, in the case of charging, voltage changes in the pack 40 may be very slow since a charger may use a very low current (6 amps) in comparison to possible discharges through devices (30 amps and more). For example, the single monitoring IC may be used to monitor a first block 20 of battery cells 12 for first period of time (e.g., 10 ms) and then to monitor a second block 20 of battery cells 12 for a second period of time (e.g., 10 ms) and so on.

Figure 30:
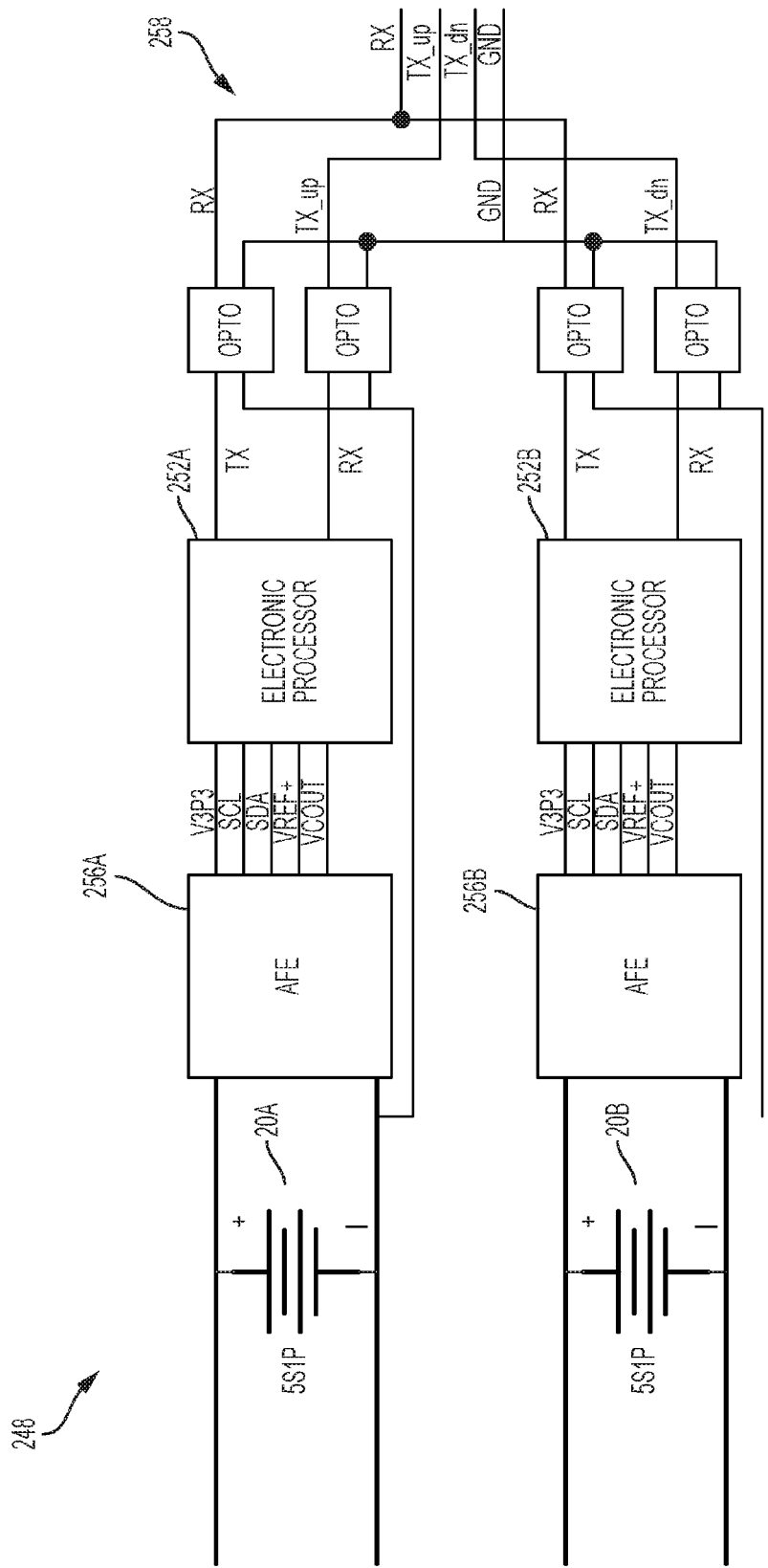
FIG. 30 is a block diagram of a battery monitoring circuit.

FIG. 30 illustrates yet another exemplary battery monitoring circuit 248. As illustrated, the battery monitoring circuit 248 includes two 5S1P cell blocks 20A and 20B. The cell block 20A is monitored by an electronic processor 252A using an analog front end (AFE) 256A. The cell block 20B is monitored by an electronic processor 252B using an AFE 256B.

The AFEs 256A-B are capable of monitoring individual cells in the cell blocks 20A-B. The AFEs 256A-B may be implemented using, for example, BQ76925 host-controlled analog front end designed by Texas Instruments. The AFEs 256A-B may be referred to singularly as the AFE 256, and the processors 252A-B may be referred to singularly as the processor 252. In other embodiments, the battery monitoring circuit 248 may include more or fewer cell blocks 20 monitored by more or fewer processors 252 and AFEs 256.

The AFE 256 provides operating power to the processor 252 over the V3P3 line. The processor 252 provides serial clock (SCL) to the AFE 256 over the SCL line. The processor 252 and the AFE 256 exchange serial data over the SDA line. For example, the processor 252 may write an address of an individual cell to be monitored at a given time to a register of the AFE 256 over the SDA line. The AFE 256 provides a reference voltage used to measure individual voltages of the battery cells 12 over the VREF+ line to the processor 252. The AFE 256 provides individual states (for example, voltages of individual cells 12) over the VCOUT line to the processor 252. The AFE 256 may provide a voltage of a particular cell 12 at the VCOUT line based on request written to the AFE 256 over the SDA line. The battery monitoring circuit 248 may additionally include a coupling circuit, for example, an opto-coupling circuit 258 that facilitates communication between the processors 252A-B and an electronic processor of a tool.

Figure 31:
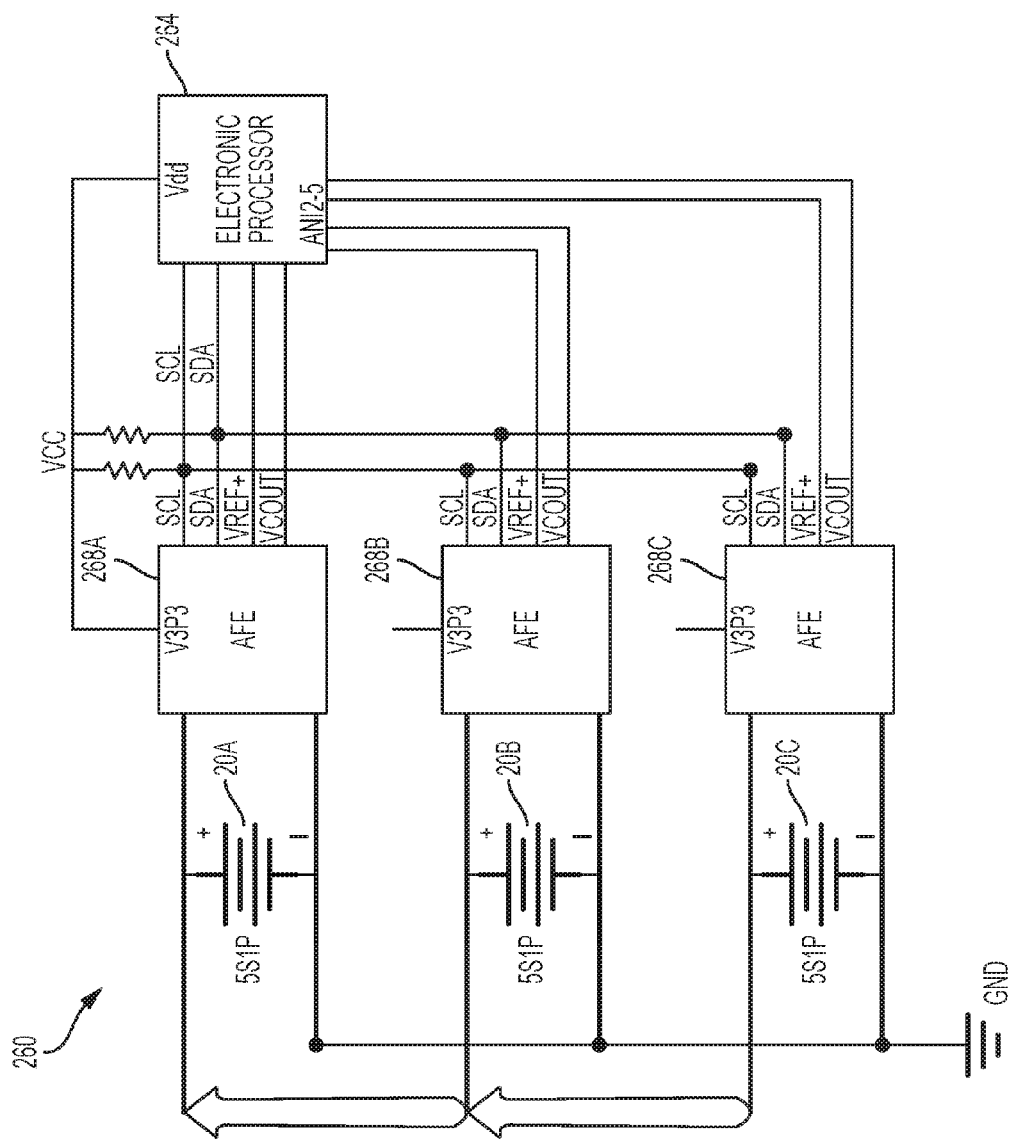
FIG. 31 is a block diagram of an alternative battery monitoring circuit.

FIG. 31 illustrates a further alternative battery monitoring circuit 260. As illustrated, the battery monitoring circuit 260 includes three 5S1P cell blocks 20A-C. Each cell block 20A-C is monitored by a single electronic processor 264 using AFEs 268A-C, respectively. As described above, the AFEs 268A-C are capable of monitoring individual cells 12 in the cell blocks 20A-C. The AFEs 268A-C may be referred to singularly as the AFE 268. In other embodiments, the battery monitoring circuit 248 may include more or fewer cell blocks 20 monitored by the processor 264 using more or fewer AFEs 268.

The processor 264 may receive operating power from one of the AFEs 268. The processor 264 provides a serial clock over the SCL lines to the AFEs 268A-C. In addition, the processor 264 and the AFEs 268A-C exchange serial data over the SDA lines. The processor 264 may receive reference voltages (VREF+) and individual cell states (VCOUT) at analog inputs ANI0-5. In the illustrated example, analog inputs ANI0-1 are connected to AFE 268A, analog inputs ANI2-3 are connected to AFE 268B, and analog inputs ANI4-5 are connected to AFE 268C.

Figure 32:
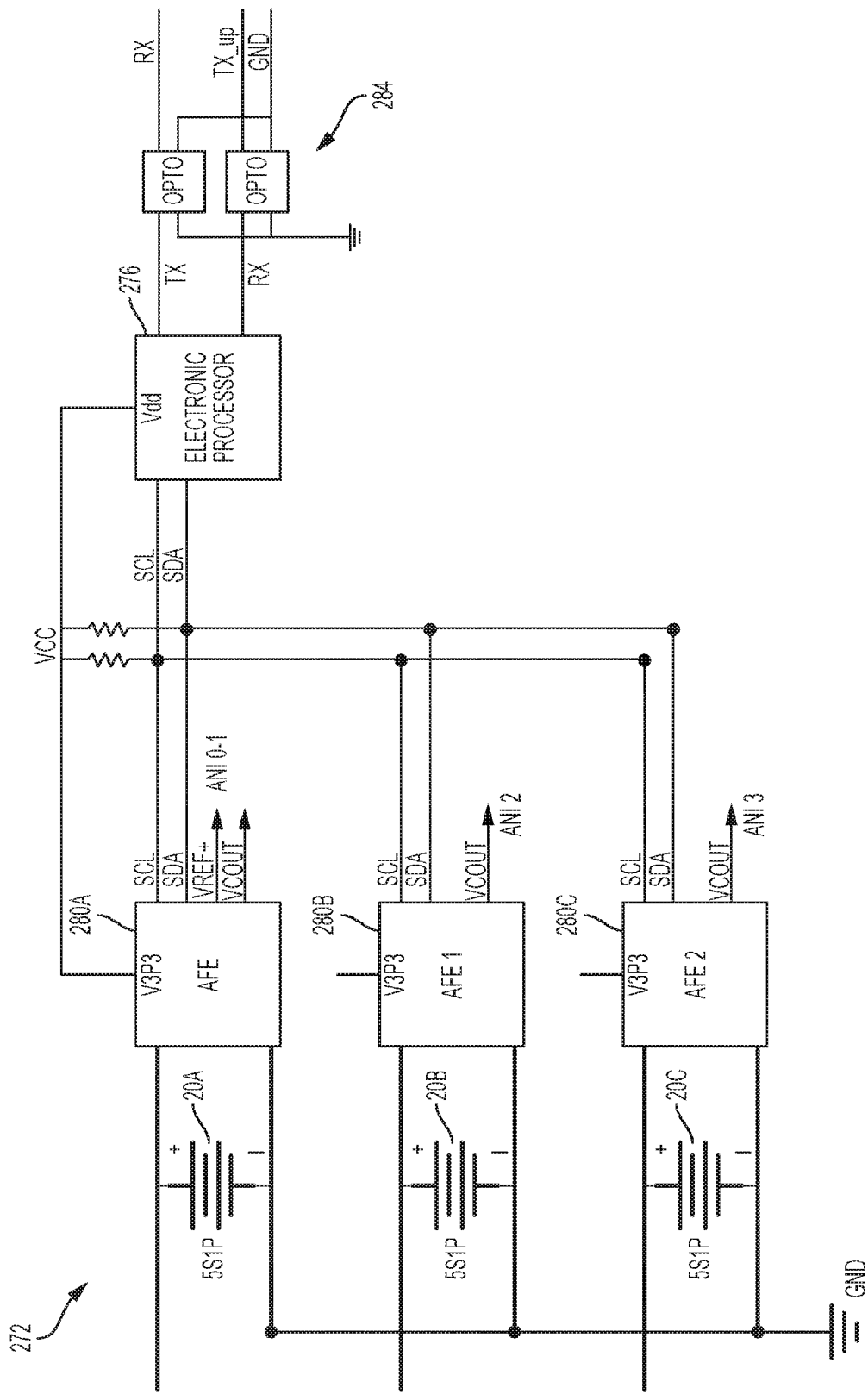
FIG. 32 is a block diagram of a battery monitoring circuit using shared inter-integrated circuit bus.

FIG. 32 illustrates another alternative battery monitoring circuit 272 using shared inter-integrated circuit (I2C) bus. As illustrated, the battery monitoring circuit 272 includes three 5S1P cell blocks 20A-C monitored by a single electronic processor 276 using AFEs 280A-C, respectively. The battery monitoring circuit 272 operates in a similar manner to the battery monitoring circuit 260 of FIG. 31.

The AFEs 280A-C communicate with the processor 276 over a shared I2C channel. Outputs of the AFEs 280A-C are provided at analog inputs ANI0-3 of the processor 276. Because all cells 12 in the cell blocks 20A-C operate at similar voltage levels, the processor 276 may be provided with a single reference voltage (VREF+) from the AFE 280A. The reference voltage VREF+ is provided at the analog input ANI0. States of individual cells (VCOUT) are provided at analog inputs ANI1-3 from the AFEs 280A-C, respectively. The battery monitoring circuit 272 may include more or fewer cell blocks 20 monitored by the processor 276 using more of fewer AFEs 280 over the shared I2C channel. The battery monitoring circuit 272 may also include an opto-coupling circuit 284.

Figure 33A:
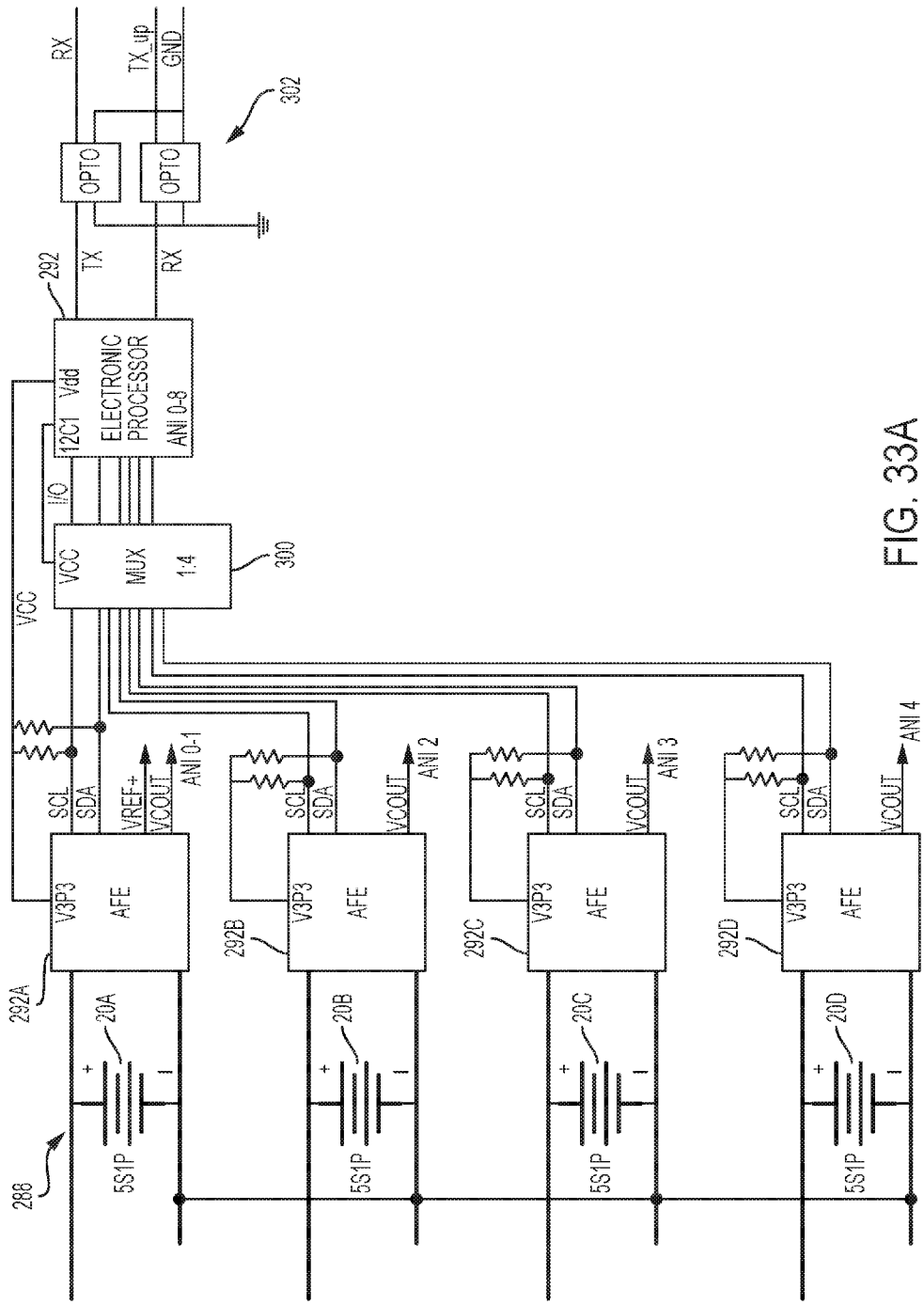
FIGS. 33A-33B are block diagrams of a battery monitoring circuit using multiplexors and a shared inter-integrated circuit bus.
Figure 33B:
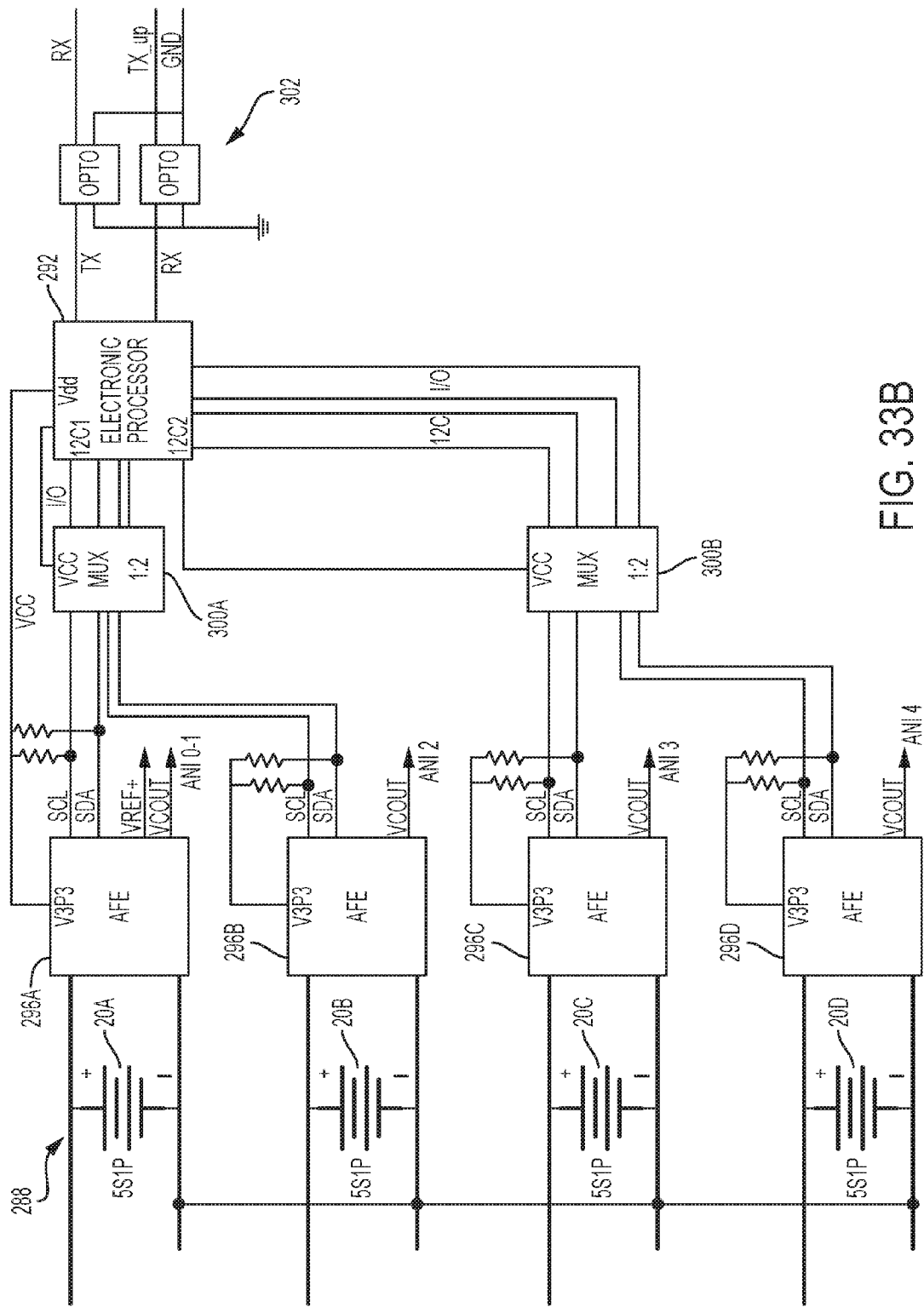

FIGS. 33A-B illustrate yet another alternative battery monitoring circuit 288 using multiplexors. As illustrated, the battery monitoring circuit 288 includes four 5S1P cell blocks 20A-D monitored by a single electronic processor 292 using AFEs 296A-D. The battery monitoring circuit 288 operates in a manner similar to the battery monitoring circuit 272 of FIG. 32.

The AFEs 296A-D communicate with the processor 292 over a shared I2C channel. As shown in FIG. 33A, a multiplexor 300 is connected between the processor 292 and the AFEs 296A-D on the shared I2C channel. The processor 292 provides selection inputs to the multiplexor 300 in order to select an AFE 296 between the 296A-D with which the processor 292 exchanges communications at a particular time. As shown in FIG. 33B, multiple multiplexors 300A-B may also be used over multiple I2C channels to facilitate communications between the processor 292 and the AFEs 296A-D. The battery monitoring circuit 288 may also include an opto-coupling circuit 302.

Figure 34:
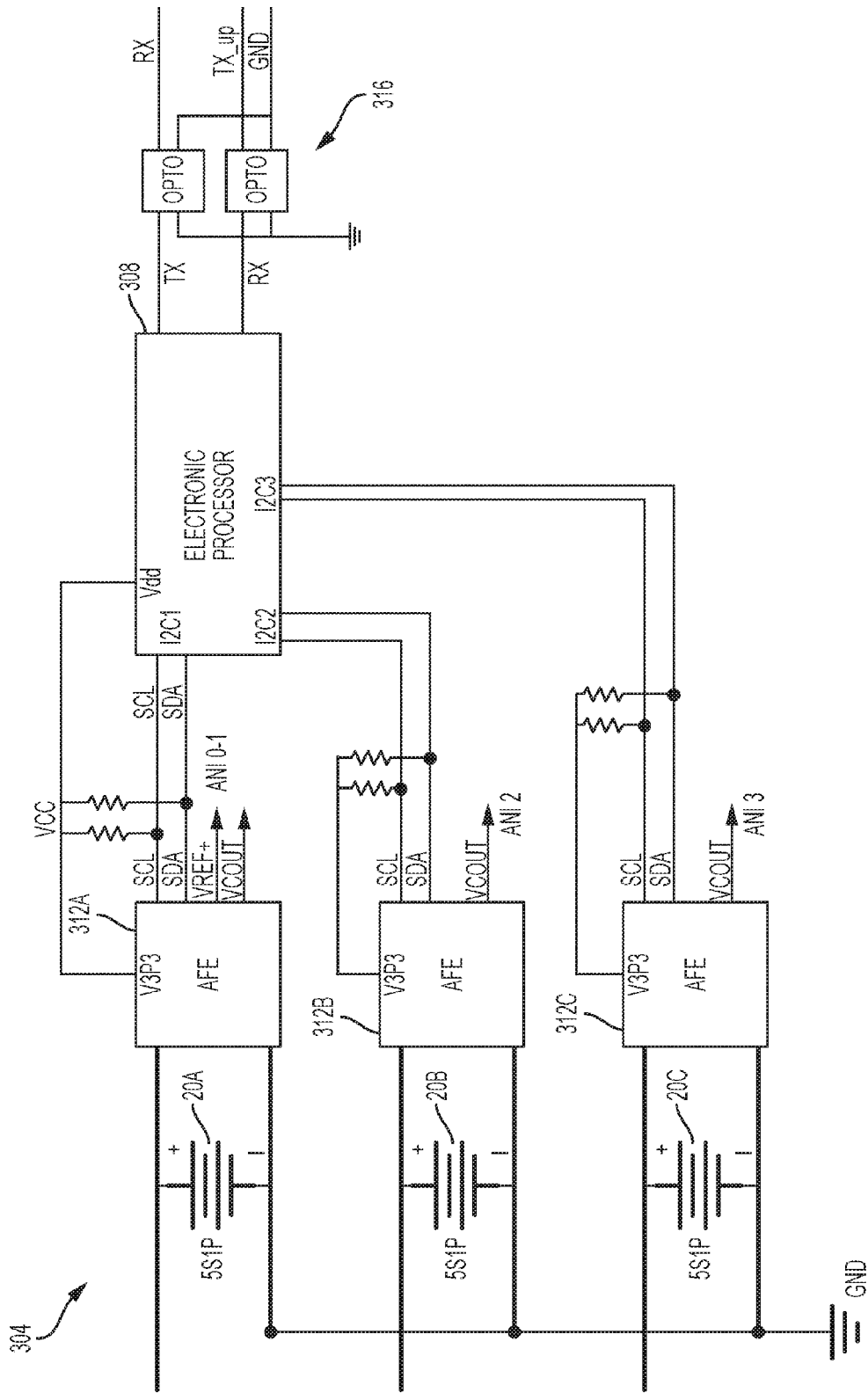
FIG. 34 is a block diagram of a battery monitoring circuit using multiple inter-integrated circuit buses.

FIG. 34 illustrates a further alternative battery monitoring circuit 304 using multiple inter-integrated circuit (I2C) buses. As illustrated, the battery monitoring circuit 304 includes three 5S1P cell blocks 20A-C monitored by a single electronic processor 308 using AFEs 312A-C respectively. The battery monitoring circuit 304 operates in a manner similar to the battery monitoring circuit 272 of FIG. 32. However, the AFEs 312A-C communicate with the processor 308 over multiple I2C channels.

For example, the AFE 312A communicates with the processor 308 over I2C channel I2C 1, the AFE 312B communicates with the processor 308 over I2C channel I2C 2, and so on. Outputs of the AFEs 312A-C are provided at analog inputs ANI0-3 of the processor 304 similar to the battery monitoring circuit 272 of FIG. 32. The battery monitoring circuit 304 may include more or fewer cell blocks 20 monitored by the processor 308 using more or fewer AFEs 312 over multiple I2C channels. The battery monitoring circuit 304 may also include an opto-coupling circuit 316.

Figure 35:
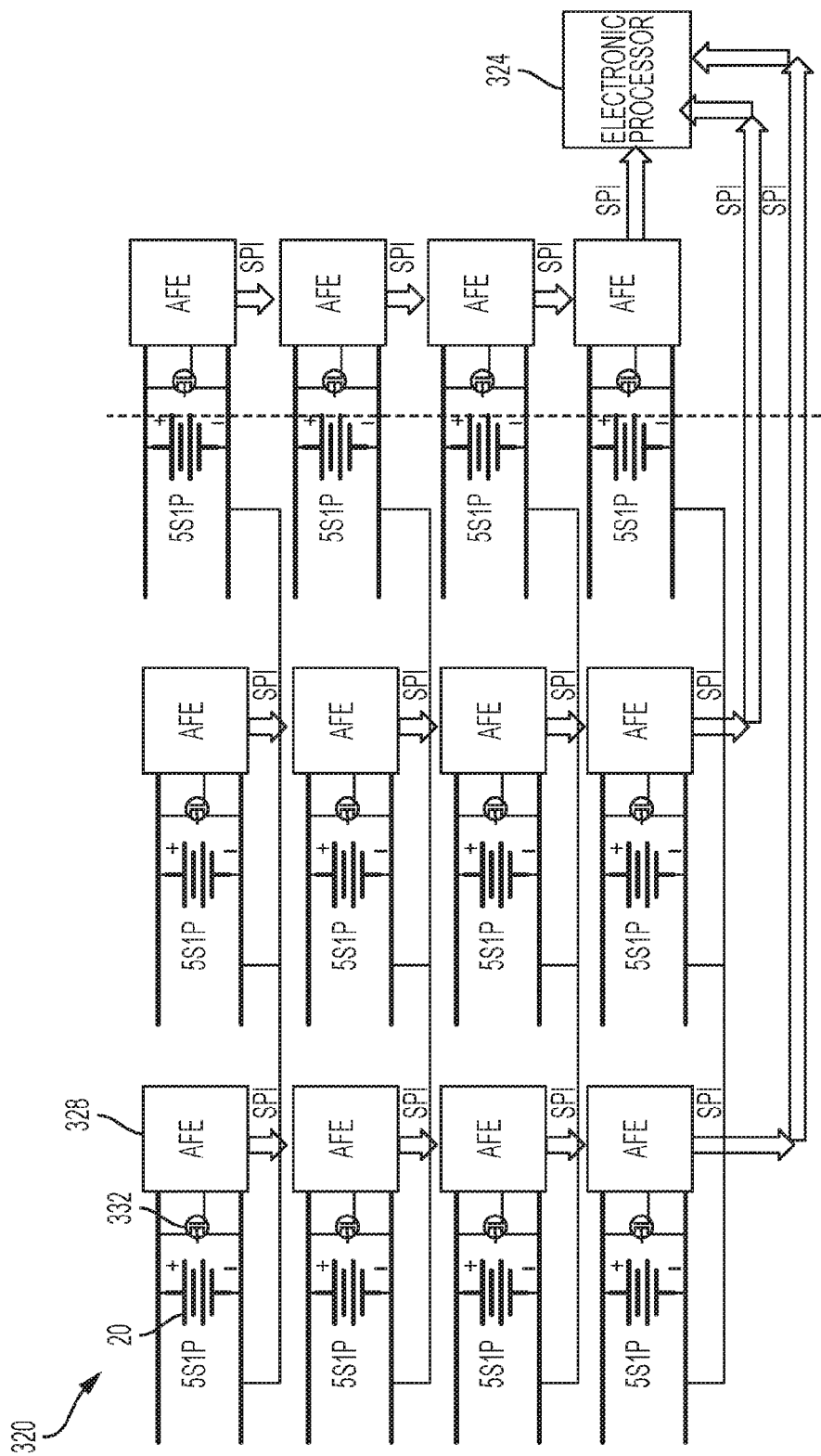
FIG. 35 is a block diagram of a battery monitoring circuit using a serial peripheral interface.

FIG. 35 illustrates another alternative battery monitoring circuit 320 using serial peripheral interface. As illustrated, several 5S1P block 20 are monitored by a single electronic processor 324 using several AFEs 328. The AFEs 328 communicate with the processor 324 using serial peripheral interface bus. The battery monitoring circuit 320 may also include several switches 332 with resistors connected across each cell block 20 to discharge the cell blocks 20 during cell balancing.

As mentioned above, the low-voltage tool and the high-voltage tool may be different tools, each operating at the given voltage level. As also mentioned above, the low-voltage tool and the high-voltage tool may be one tool (or other electrical device) capable of operating in different voltage levels or modes.

For example, the dual-mode battery pack 40 may be used to power a tool having a reconfigurable, dual-mode motor operable to run under different voltage levels. For instance, the tool may have a low voltage level mode (e.g., an 18V mode; with an increased amp-hour capacity or run-time) in which the motor is configured to be optimally powered by a low voltage power source, and a high voltage level mode (e.g., a 36V mode) in which the motor is configured to be optimally powered by a high voltage power source. Setting the tool and battery pack 40 to an optimal voltage level can, in turn, lead to a more efficient motor operation at the given voltage level.

As another example, the dual-mode tool may be another electrical device having a reconfigurable, dual-mode load.

As described above, the invention may generally provide, among other things, a dual-mode battery pack and methods and systems to implement the dual-mode arrangement. The invention may also generally provide methods and systems for monitoring and/or balancing individual cells.

One or more independent features and/or independent advantages of the invention may be set forth in the following claims:

What is claimed is:

1. A dual-mode battery pack comprising:
    a housing;
    a first set of battery cells connected in series and positioned in the housing;
    a second set of battery cells connected in series and positioned in the housing;
    series connection contacts configured to connect the first set of battery cells and the second set of battery cells in series when closed; and
    parallel connection contacts configured to connect the first set of battery cells and the second set of battery cells in parallel when closed,
    wherein the series connection contacts are configured to receive a conductive blade contact of a first power tool to engage the series connection contacts, and the parallel connection contacts are configured to receive an insulating rib of the first power tool to disengage the parallel connection contacts.

2. The battery pack of claim 1, wherein the series connection contacts include normally open contacts and the parallel connection contacts include normally closed contacts.

3. The battery pack of claim 1, wherein the first power tool operates at a first voltage level, and wherein the set of parallel connection contacts are configured to be in the normally closed state when connected to a second power tool operating at a second voltage level, the second voltage level being lower than the first voltage level.

4. The battery pack of claim 1, further comprising a terminal block including a positive terminal and a negative terminal configured to be coupled to power terminals of a power tool.

5. The battery pack of claim 1, further comprising:
    a first analog front end connected to the first set of battery cells and configured to individually monitor the first set of battery cells;
    a second analog front end connected to the second set of battery cells and configured to individually monitor the second set of battery cells; and
    an electronic processor connected to the first analog front end and the second analog front end.

6. The battery pack of claim 5, wherein the first analog front end is configured to individually monitor the voltage of the first set of battery cells.

7. The battery pack of claim 6, wherein the processor is configured to
    receive a plurality of voltage values for the first set of battery cells from the first analog front end, and
    passively balance the first set of battery cells based on the plurality of the voltage values.

8. The battery pack of claim 1, wherein the second analog front end is configured to individually monitor the voltage of the second set of battery cells.

9. The battery pack of claim 8, wherein the processor is configured to
    receive a plurality of voltage values for the second set of battery cells from the second analog front end, and
    passively balance the second set of battery cells based on the plurality of the voltage values.

10. A method for configuring a dual mode battery pack, the battery pack including a housing, a first set of battery cells connected in series and positioned in the housing, and a second set of battery cells connected in series and positioned in the housing, the method comprising:
    disengaging, with an insulating rib of a power tool, parallel connection contacts operable to connect the first set of battery cells and the second set of battery cells in parallel, the power tool being external to the battery pack; and
    engaging, with conducting blades of the power tool, series connection contacts to connect the first set of battery cells and the second set of battery cells in series.

11. The method of claim 10, wherein disengaging the parallel connection contacts occurs before engaging the series connection contacts.

12. The method of claim 10, further comprising:
    disengaging the series connection contacts; and
    engaging the parallel connection contacts.

13. The method of claim 12, wherein disengaging the series connection contacts occurs before engaging the parallel connection contacts.

14. The method of claim 10, wherein disengaging includes disengaging normally closed parallel connection contacts.

15. The method of claim 10, wherein engaging includes engaging normally open series connection contacts.

* * * * *